(12) United States Patent
Yang et al.

(10) Patent No.: US 10,355,844 B2
(45) Date of Patent: Jul. 16, 2019

(54) METHOD AND USER EQUIPMENT FOR SENDING UPLINK SIGNAL, AND METHOD AND BASE STATION FOR RECEIVING UPLINK SIGNAL

(71) Applicant: LG ELECTRONICS INC., Seoul (KR)

(72) Inventors: Suckchel Yang, Seoul (KR); Joonkui Ahn, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/540,248

(22) PCT Filed: Jan. 13, 2016

(86) PCT No.: PCT/KR2016/000370
§ 371 (c)(1),
(2) Date: Jun. 27, 2017

(87) PCT Pub. No.: WO2016/114593
PCT Pub. Date: Jul. 21, 2016

(65) Prior Publication Data
US 2018/0013533 A1 Jan. 11, 2018

Related U.S. Application Data

(60) Provisional application No. 62/158,557, filed on May 8, 2015, provisional application No. 62/102,605, filed on Jan. 13, 2015.

(51) Int. Cl.
*H04W 4/00* (2018.01)
*H04L 5/00* (2006.01)
(Continued)

(52) U.S. Cl.
CPC .......... *H04L 5/0055* (2013.01); *H04L 1/1671* (2013.01); *H04L 1/1812* (2013.01);
(Continued)

(58) Field of Classification Search
CPC ... H04L 1/1671; H04L 1/1812; H04L 1/1887; H04L 5/0055; H04W 72/0413
See application file for complete search history.

(56) References Cited

U.S. PATENT DOCUMENTS

2012/0113914 A1 5/2012 Zhao et al.
2013/0010620 A1 1/2013 Dinan
(Continued)

FOREIGN PATENT DOCUMENTS

JP 2012039214 2/2012
JP 2014116865 6/2014
(Continued)

OTHER PUBLICATIONS

PCT International Application No. PCT/KR2016/000370, Written Opinion of the International Searching Authority dated May 4, 2016, 16 pages.
(Continued)

*Primary Examiner* — Minh Trang T Nguyen
(74) *Attorney, Agent, or Firm* — Lee, Hong, Degerman, Kang & Waimey

(57) ABSTRACT

A method for requesting an uplink scheduling is provided. In the case that there is an SR PUCCH resource established on a secondary cell, not an SR PUCCH resource established on a primary cell, and a special secondary cell is in a state of de-activation at the time of sending an uplink scheduling request, the uplink scheduling request is stopped and a random access procedure is initiated. If the uplink scheduling request can be sent on a plurality of cells at the same point of time, that is, if there are a plurality of uplink
(Continued)

resources available for the uplink scheduling request at the same point of time, the uplink scheduling request is sent only on one of the plurality of cells (and using only one uplink resource).

18 Claims, 14 Drawing Sheets

(51) Int. Cl.
```
H04L 1/16      (2006.01)
H04L 1/18      (2006.01)
H04W 72/04     (2009.01)
H04W 72/12     (2009.01)
H04W 74/08     (2009.01)
```
(52) U.S. Cl.
CPC ............ *H04L 1/1887* (2013.01); *H04L 5/001* (2013.01); *H04L 5/0053* (2013.01); *H04W 72/0413* (2013.01); *H04W 72/1284* (2013.01); *H04W 74/0833* (2013.01)

(56) References Cited

U.S. PATENT DOCUMENTS

| | | | |
|---|---|---|---|
| 2013/0010716 A1* | 1/2013 | Dinan | H04W 76/15 370/329 |
| 2013/0250828 A1 | 9/2013 | Chou et al. | |
| 2013/0279433 A1* | 10/2013 | Dinan | H04W 56/0005 370/329 |
| 2014/0293898 A1 | 10/2014 | Tseng | |
| 2015/0264592 A1* | 9/2015 | Novlan | H04L 27/2601 370/252 |

FOREIGN PATENT DOCUMENTS

| | | |
|---|---|---|
| WO | 2013168917 | 11/2013 |
| WO | 2014141965 | 2/2017 |

OTHER PUBLICATIONS

Alcatel-Lucent, "UCI transmission for dual connectivity and PUCCH resource allocation", 3GPP TSG RAN WG1 Meeting #76, R1-140164, Feb. 2014, 3 pages.
QUALCOMM, "Remaining details for PUCCH on SCell", 3GPP TSG RAN WG1 Meeting #78, R1-142953, Aug. 2014, 5 pages.
European Patent Office Application Serial No. 16737557.5, Search Report dated Aug. 2, 2018, 11 pages.
SAMSUNG, "Scheduling Request in SCG", 3GPP TSG RAN WG2 Meeting #87, R2-143136, Aug. 2014, 2 pages.
Mediatek, "Impacts of Small Cell on and off", 3GPP TSG RAN WG2 Meeting #86, R2-142179, May 2014, 8 pages.
European patent application No. 16737557.5, European Office Action dated Apr. 23, 2019, 12 pages.
NTT DOCOMO, Inc., "Support of PUCCH on SCell for CA—RAN2 aspects," 3GPP TSG-RAN WG2 #87, R2-143073, XP050794200, Dresden, Germany, Aug. 18-22, 2014, 10 pages.
RAN WG1, "LS on RAN1 TDD-FDD CA outcome," 3GPP TSG RAN WG4 Meeting #71, R4-143816, XP050798434, Seoul, South Korea, May 19-23, 2014, 5 pages.

* cited by examiner

FIG. 7
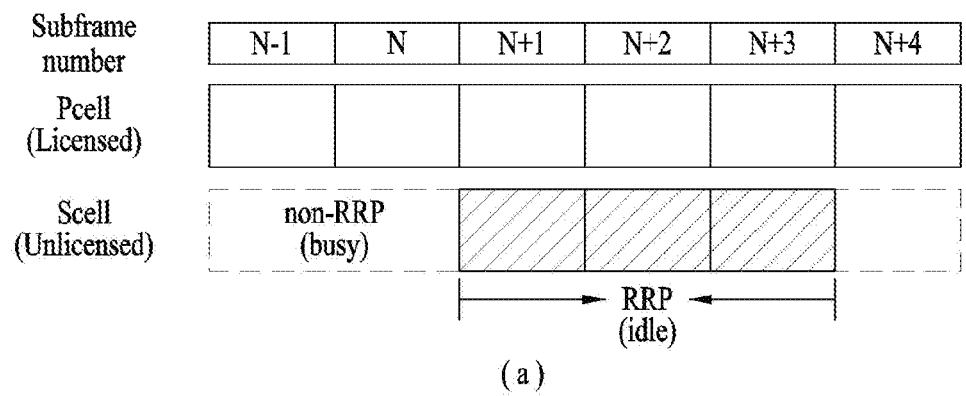
(a)
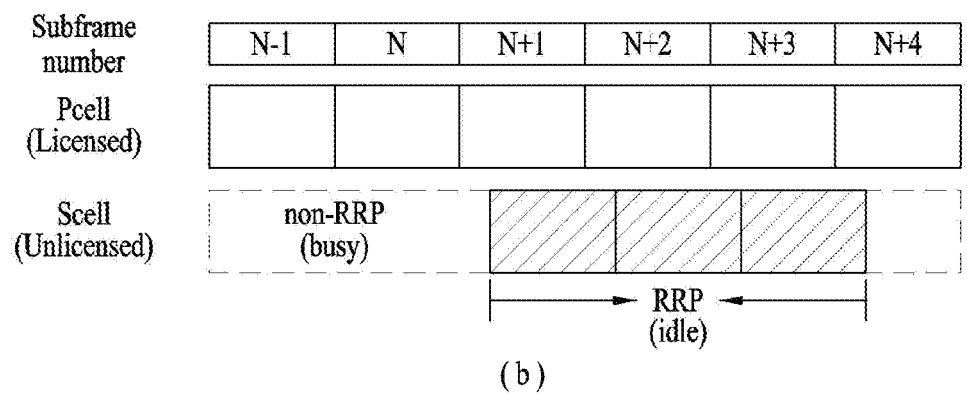
(b)

PUCCH format 1a and 1b structure (normal CP case)

METHOD AND USER EQUIPMENT FOR SENDING UPLINK SIGNAL, AND METHOD AND BASE STATION FOR RECEIVING UPLINK SIGNAL

CROSS-REFERENCE TO RELATED APPLICATIONS

This application is the National Stage filing under 35 U.S.C. 371 of International Application No. PCT/KR2016/000370, filed on Jan. 13, 2016, which claims the benefit of U.S. Provisional Application No. 62/102,605, filed on Jan. 13, 2015 and 62/158,557, filed on May 8, 2015, the contents of which are all hereby incorporated by reference herein in their entirety.

TECHNICAL FIELD

The present invention relates to a wireless communication system, and more particularly, to a method for transmitting or receiving an uplink signal and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solutions

A method for transmitting/receiving an uplink scheduling request and an apparatus therefor are provided. If there is only an SR PUCCH resource configured for a secondary cell other than an SR PUCCH resource configured for a primary cell at the time of transmission of the uplink scheduling request and the secondary cell is in a deactivated state, the uplink scheduling request may be stopped, a random access procedure may be initiated.

If an uplink scheduling request can be transmitted in a plurality of cells at the same time, that is, if there are a plurality of uplink resources available for the uplink scheduling request at the same time, the uplink scheduling request may be transmitted in only one of the cells (and using only one uplink resource).

In one aspect of the present invention, provided herein is a method for transmitting an uplink signal by a user equipment configured with a plurality of cells. The method comprises: configuring a scheduling request (SR) physical uplink control channel (PUCCH) resource (hereinafter, a primary cell SR PUCCH resource) on a primary cell among the plurality of cells and configuring an SR PUCCH resource (hereinafter, a secondary cell SR PUCCH resource) on a special secondary cell configured as a secondary cell for PUCCH transmission among the plurality of cells, and transmitting a random access channel when there is only the secondary cell SR PUCCH resource other than the primary cell SR PUCCH resource and the special secondary cell is in a deactivated state at a time for transmission of an uplink scheduling request.

In another aspect of the present invention, provided herein is a user equipment for transmitting an uplink signal. The user equipment is configured with a plurality of cells. The user equipment includes a radio frequency (RF) unit, and a processor configured to control the RF unit. The processor may configure a scheduling request (SR) physical uplink control channel (PUCCH) resource (hereinafter, a primary cell SR PUCCH resource) on a primary cell among the plurality of cells and configure an SR PUCCH resource (hereinafter, a secondary cell SR PUCCH resource) on a special secondary cell configured as a secondary cell for PUCCH transmission among the plurality of cells. The processor may control the RF unit to transmit a random access channel when there is only the secondary cell SR PUCCH resource other than the primary cell SR PUCCH resource and the special secondary cell is in a deactivated state at a time for transmission of an uplink scheduling request.

In another aspect of the present invention, provided herein is a method for receiving, by a base station, an uplink signal from a user equipment configured with a plurality of cells. The method comprises: transmitting configuration information about a scheduling request (SR) physical uplink control channel (PUCCH) resource (hereinafter, a primary cell SR PUCCH resource) on a primary cell among the plurality of cells and configuration information about an SR PUCCH resource (hereinafter, a secondary cell SR PUCCH resource) on a special secondary cell configured as a secondary cell for PUCCH transmission among the plurality of cells, and receiving a random access channel when there is only the secondary cell SR PUCCH resource other than the primary cell SR PUCCH resource and the special secondary cell is in a deactivated state at a time for transmission of an uplink scheduling request.

In another aspect of the present invention, provided herein is a base station for receiving an uplink signal from a user equipment configured with a plurality of cells. The base station includes a radio frequency (RF) unit, and a processor configured to control the RF unit. The processor may control the RF unit to transmit configuration information about a scheduling request (SR) physical uplink control channel (PUCCH) resource (hereinafter, a primary cell SR PUCCH resource) on a primary cell among the plurality of cells and configuration information about an SR PUCCH resource (hereinafter, a secondary cell SR PUCCH resource) on a special secondary cell configured as a secondary cell for PUCCH transmission among the plurality of cells. The processor may control the RF unit to receive a random access channel when there is only the secondary cell SR PUCCH resource other than the primary cell SR PUCCH resource and the special secondary cell is in a deactivated state at a time for transmission of an uplink scheduling request.

In the respective aspects of the present invention, transmission of the uplink scheduling request using the secondary cell SR PUCCH resource may be stopped when there is only the secondary cell SR PUCCH resource other than the primary cell SR PUCCH resource and the special secondary cell is in the deactivated state at the time for transmission of the uplink scheduling request.

In the respective aspects of the present invention, when PUCCH resources available for transmission of the SR exist in two or more cells at the time for transmission of the uplink scheduling request, the uplink scheduling request may be transmitted in only one of the two or more cells.

In the respective aspects of the present invention, the plurality of cells may include a primary cell group composed of the primary cell and zero or more secondary cell and a secondary cell group composed of one or more secondary cells not belonging to the primary cell group, and the special secondary cell may belong to the secondary cell group.

In the respective aspects of the present invention, when there is the primary cell SR PUCCH resource or the secondary cell SR PUCCH resource at a time for transmission of ACK/NACK for at least one of the plurality of cells, information configured by adding one bit to a payload of the ACK/NACK may be transmitted.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 7 illustrates a subframe configuration of a reserved resource period (RRP).

MODE FOR CARRYING OUT THE INVENTION

Figure 1:
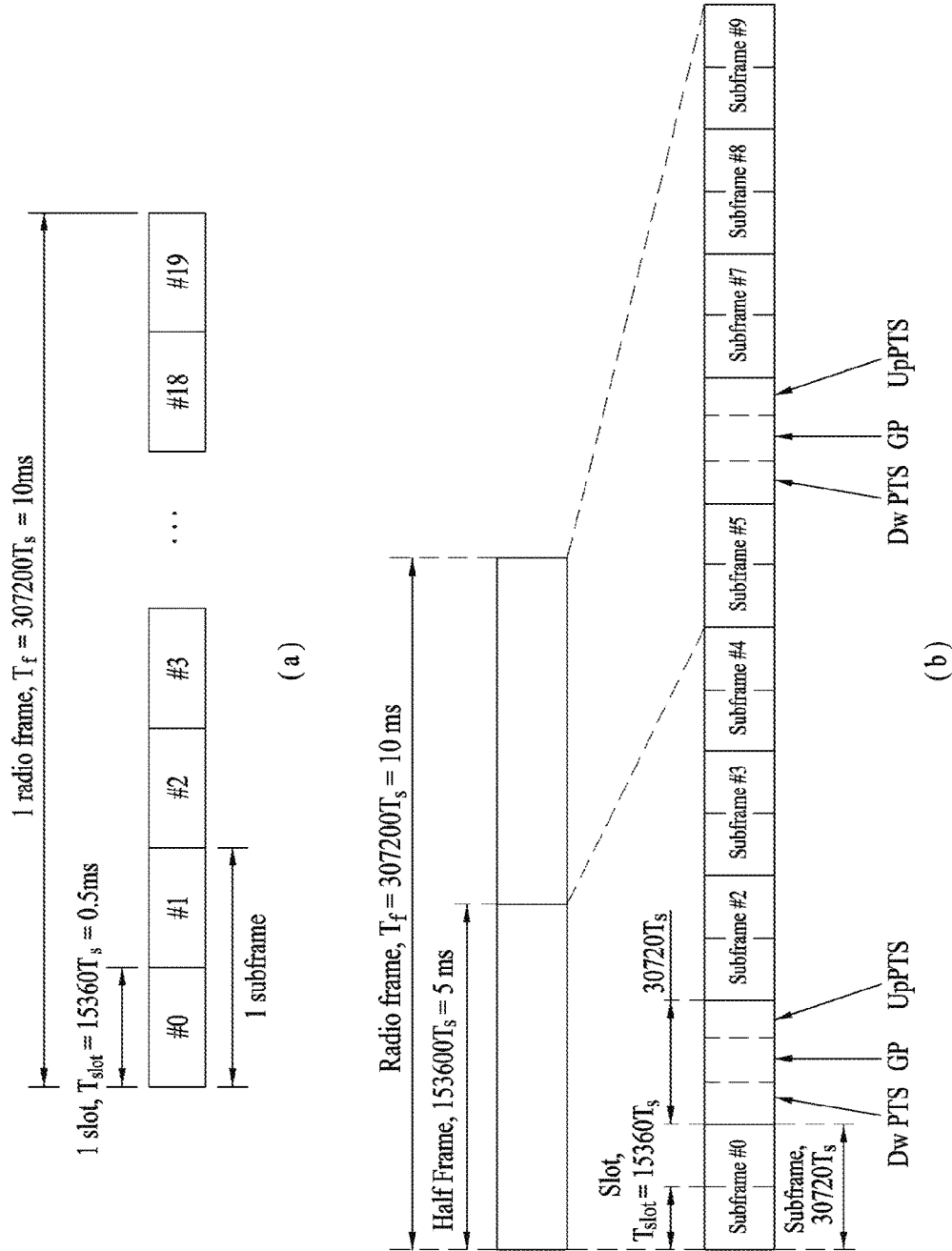
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For details of CSI-RS configuration, see 3GPP TS 36.211 and 3GPP TS 36.331.

Meanwhile, the 3GPP LTE/LTE-A system uses the concept of a cell to manage radio resources, and the cell associated with a radio resource is distinguished from a cell of a geographical area.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in down | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | — |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
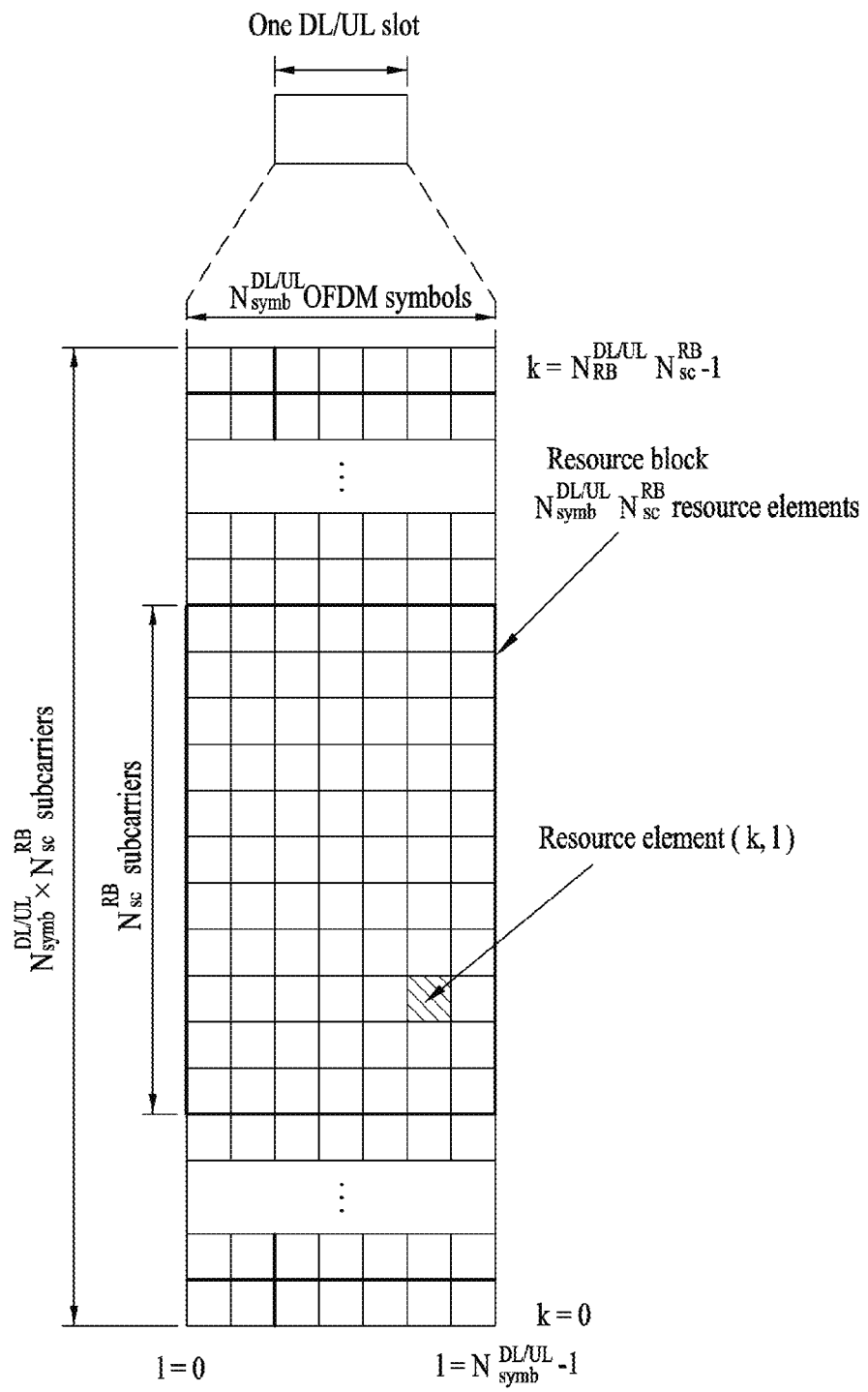
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{RB}_{DL}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k,l) within one slot. k is an index ranging from 0 to $N^{DL/UL}_{RB}*N^{RB}_{sc}-1$ in the frequency domain, and l is an index ranging from 0 to $N^{DL/UL}_{symb}1-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

More specifically, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting the SSS which is transmitted twice in one radio frame with different sequences.

A UE, which has demodulated a DL signal by performing a cell search procedure using PSS/SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB17 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The DL carrier frequency and the corresponding system bandwidth may be acquired through the PBCH, and the UL carrier frequency and the corresponding system bandwidth may be acquired through system information, which is a DL signal. For example, the UE may acquire a SystemInformationBlockType2 (SIB2) and determine the entire UL system band that the UE is allowed to use for UL transmission, through the UL-carrier frequency and UL-bandwidth information in the SIB2.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH. The random access procedure will be described in more detail with reference to FIGS. 11 and 12.

After performing the aforementioned procedure, the UE may perform PDDCH/PDSCH reception and PUSCH/PUCCH transmission as general uplink/downlink transmission procedures.

Figure 3:
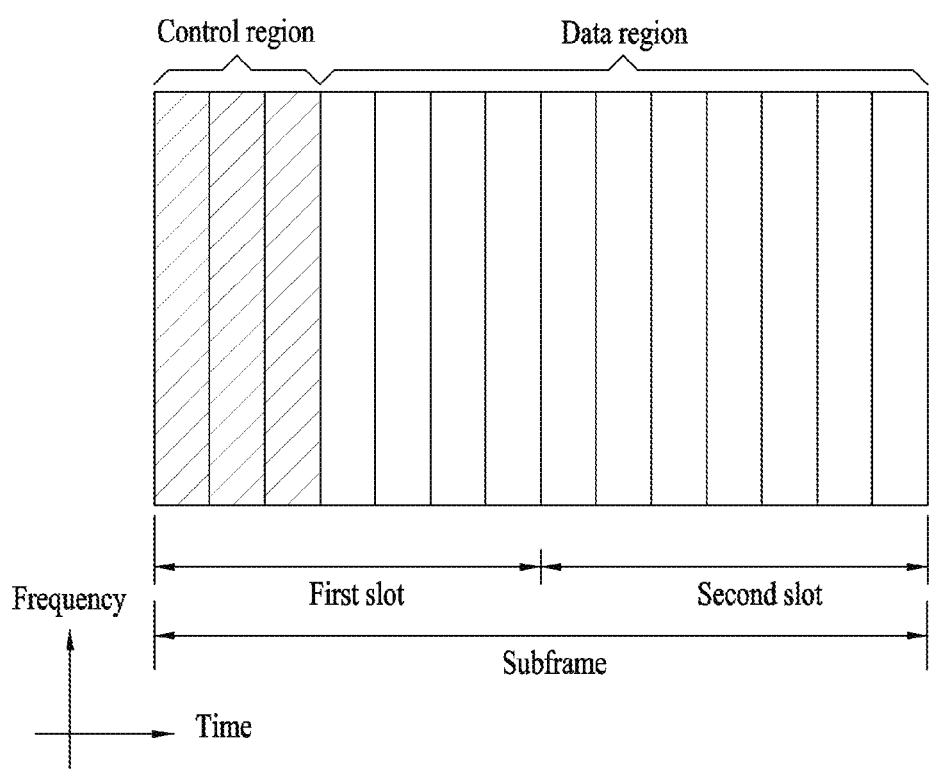
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH informs the UE of the number of OFDM symbols used for the control channel in a subframe for each corresponding subframe. The PCFICH is positioned on the first OFDM symbol. The PCFICH is configured by four resource element groups (REGs), and each of the REGs is distributed in the control region based on the cell ID. One REG consists of four REs.

The PHICH carries a HARQ (Hybrid Automatic Repeat Request) ACK/NACK (acknowledgment/negative-acknowledgment) signal as a response to UL transmission. The PHICH consists of three REGs and is cell-specifically scrambled. ACK/NACK is indicated by 1 bit, and the 1-bit ACK/NACK is repeated 3 times and each repeated ACK/NACK bit is spread by a spreading factor (SF) 4 or 2 and mapped to the control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

For example, DCI Format 3 is used for transmission of TPC commands with 2-bit power adjustments for PUCCH and PUSCH. DCI format 3 is used for transmission of TPC command number 1, TPC command number 2, . . . , TPC command number N, where N=floor($L_{format0}/2$) and $L_{format0}$ is equal to the payload size of the DCI format 0 before CRC attachment when DCI format 0 is mapped onto the common search space, including any padding bits appended to DCI format 0. The tpc-Index provided by the higher layer (e.g., RRC) determines an index to the TPC command for a given UE.

DCI format 3A is used for transmission of TPC commands with 1-bit power adjustments for PUCCH and PUSCH. DCI format 3A is used for transmission of TPC command number 1, TPC command number 2, . . . , TPC command number M, where M=$L_{format0}$ and $L_{format0}$ is equal to the payload size of the DCI format 0 before CRC attachment when DCI format 0 is mapped onto the common search space, including any padding bits appended to DCI format 0. The tpc-Index provided by the higher layer (e.g., RRC) determines an index to the TPC command for a given UE.

For example, one tpc-Index corresponds to a specific 2-bit TPC command in DCI format 3/3A. The UE may apply, to power control, a 2-bit TPC command corresponding to the tpc-Index assigned thereto in the received DCI format 3/3A.

A plurality of PDCCHs may be transmitted within a control region. A UE may monitor the plurality of PDCCHs.

An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is allocated to the first m OFDM symbols(s) in the subframe. Here, m is an integer greater than or equal to 1 and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in the system may be numbered from 0 to $N_{CCE}-1$, where $N_{CCE}$=floor($N_{REG}/9$) and $N_{REG}$ denotes the number of REGs not allocated to PCFICH or PHICH.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Meanwhile, a PDCCH may be additionally allocated in the data region (e.g., a resource region for PDSCH). The PDCCH allocated to the data region is referred to as EPD-CCH. As shown, scheduling restriction due to the limited control channel resources of the PDCCH region may be eased by securing additional control channel resources through the EPDCCH. Like the PDCCH, the EPDCCH carries DCI. For example, the EPDCCH may carry downlink scheduling information and uplink scheduling information. For example, the UE may receive the EPDCCH and receive data/control information on a PDSCH corresponding to the EPDCCH. In addition, the UE may receive the EPDCCH and transmit data/control information on the PUSCH corresponding to the EPDCCH. Depending on the cell type, the EPDCCH/PDSCH may be allocated from the first OFDM symbol of the subframe. Unless otherwise specified, the expression PDCCH herein is used to represent both PDCCH and EPDCCH.

Figure 4:
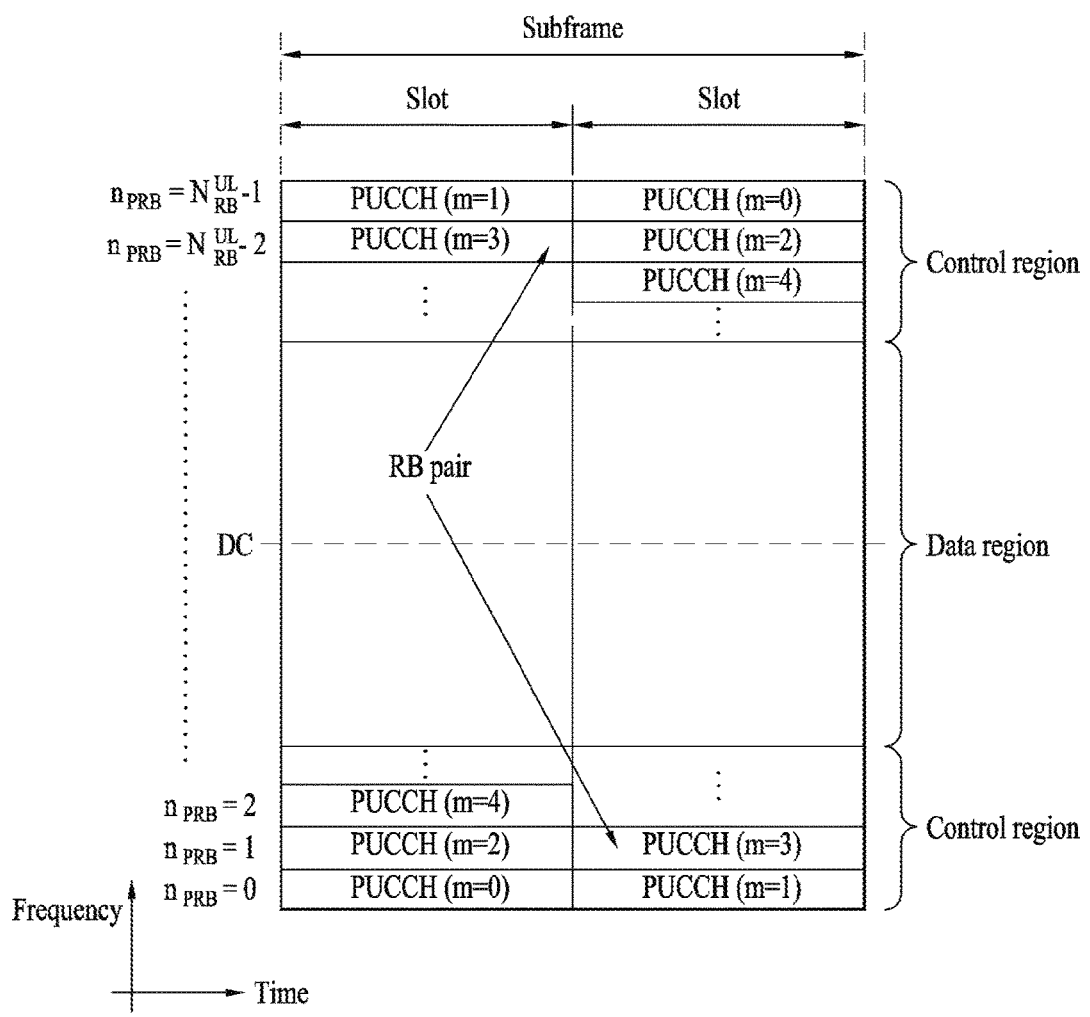
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords.

For example, the HARQ-ACK for a PDCCH or a PDSCH received in one subframe on a single carrier may be represented by 1 bit. If the UE detects the PDCCH and successfully decodes the PDSCH, it will feed back a bit (e.g., 1b) indicating ACK. If the UE fails to detect the PDCCH or fails to decode the PDSCH, it will feed back a bit (e.g., 0b) indicating NACK. The HARQ-ACK for PDCCHs/PDSCHs on multiple carriers or for PDCCH/PDSCHs in multiple subframes may be represented by two bits. For example, when the HARQ-ACK for the PDCCHs/PDSCHs on two carriers or in two subframes is fed back, if the PDCCH is detected either on the two carriers or in two subframes and if the PDSCH is decoded, the corresponding ACK/NACK bit may be set according to the result of decoding of the PDSCH. If the PDCCH is not detected in the other ones of the two carriers or two subframes, the corresponding HARQ-ACK corresponds to DTX, but the UE must feed back the 2-bit HARQ-ACK to the eNB. Accordingly, the UE sets the other one of the two bits of the HARQ-ACK to NACK, and feeds back the same to the eNB.

A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

For a CC (or cell) configured in TDD, the following issue may be raised when the UE transmits an ACK/NACK signal to the eNB: If the UE misses a part of the PDCCH(s) sent by the eNB during a plurality of subframe periods, the UE may not even know that the PDSCH corresponding to the missed PDCCH has been transmitted to the UE, and thus an error may occur when generating the ACK/NACK. To address this issue, the DL grant PDCCH/SPS release PDCCH for the TDD CC includes a DAI field (i.e., a DL DAI field). The value of the DL DAI field indicates an accumulated value (i.e., a count value) of the PDCCH(s) corresponding to the PDSCH(s) and the PDCCH(s) indicating DL SPS release up to the current subframe in the DL subframe(s) n-k (k∈K). For example, when three DL subframes correspond to one UL subframe, indexes are sequentially assigned (i.e., sequentially counted) to PDSCHs transmitted during the three DL subframe periods, and are then sent on a PDCCH for scheduling the PDSCHs. The UE may determine whether the previous PDCCHs were properly received, based on the DAI information on the PDCCH.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

Hereinafter, the PUCCH allocated for SR transmission is referred to as an SR PUCCH, the PUCCH allocated for transmission of HARQ-ACK is referred to as an ACK/NACK PUCCH, and the PUCCH allocated for CSI transmission is referred to as a CSI PUCCH.

Figure 5:
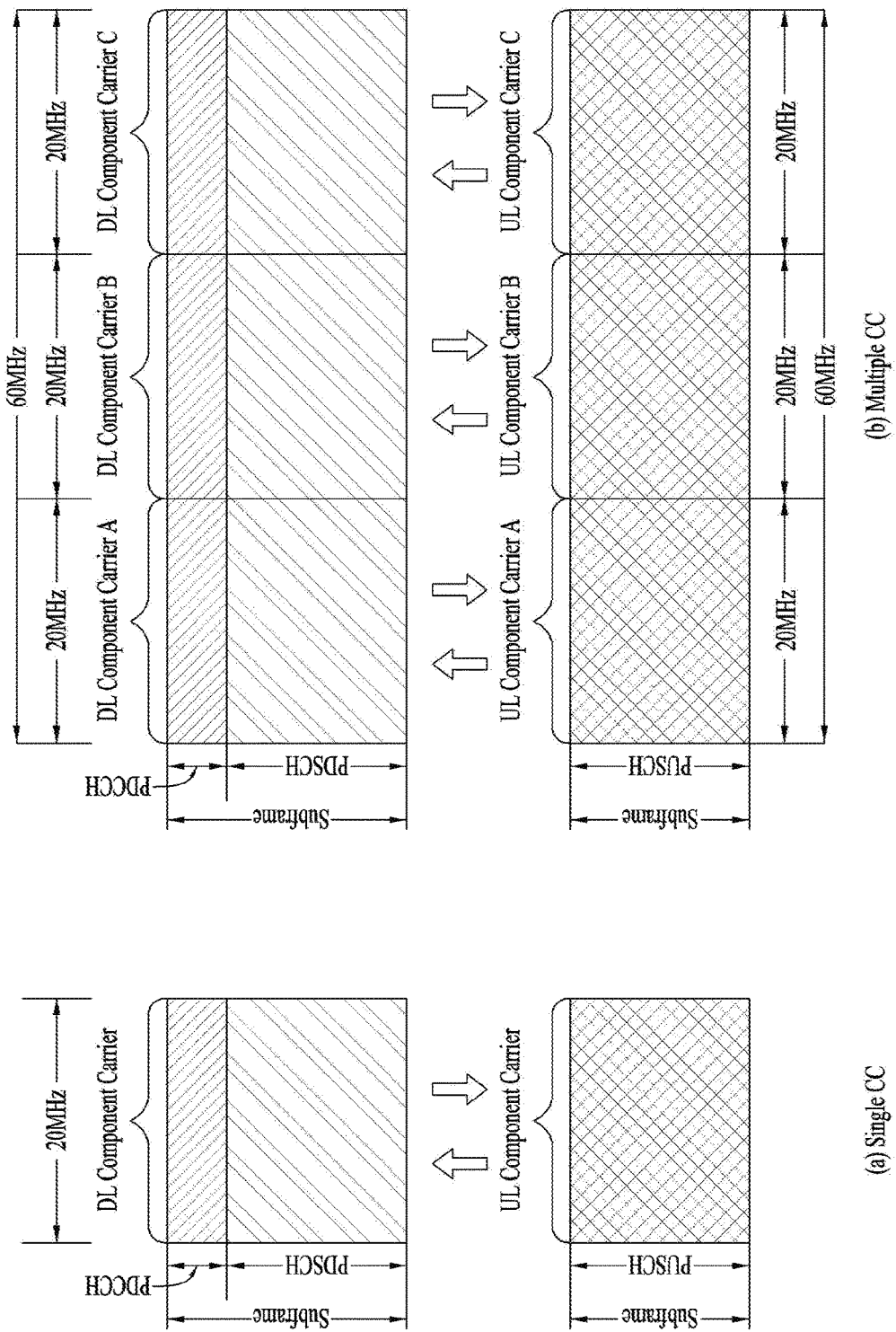
FIG. 5 is a diagram for explaining single-carrier communication and multi-carrier communication.

FIG. 5 is a diagram for explaining single-carrier communication and multi-carrier communication. Specially, FIG. 5(a) illustrates a subframe structure of a single carrier and FIG. 5(b) illustrates a subframe structure of multiple carriers.

Referring to FIG. 5(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 5(b), three 20 MHz CCs in each of UL and DL are aggregated to support a BW of 60 MHz. The CCs may be contiguous or non-contiguous in the frequency domain. Although FIG. 5(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 6:
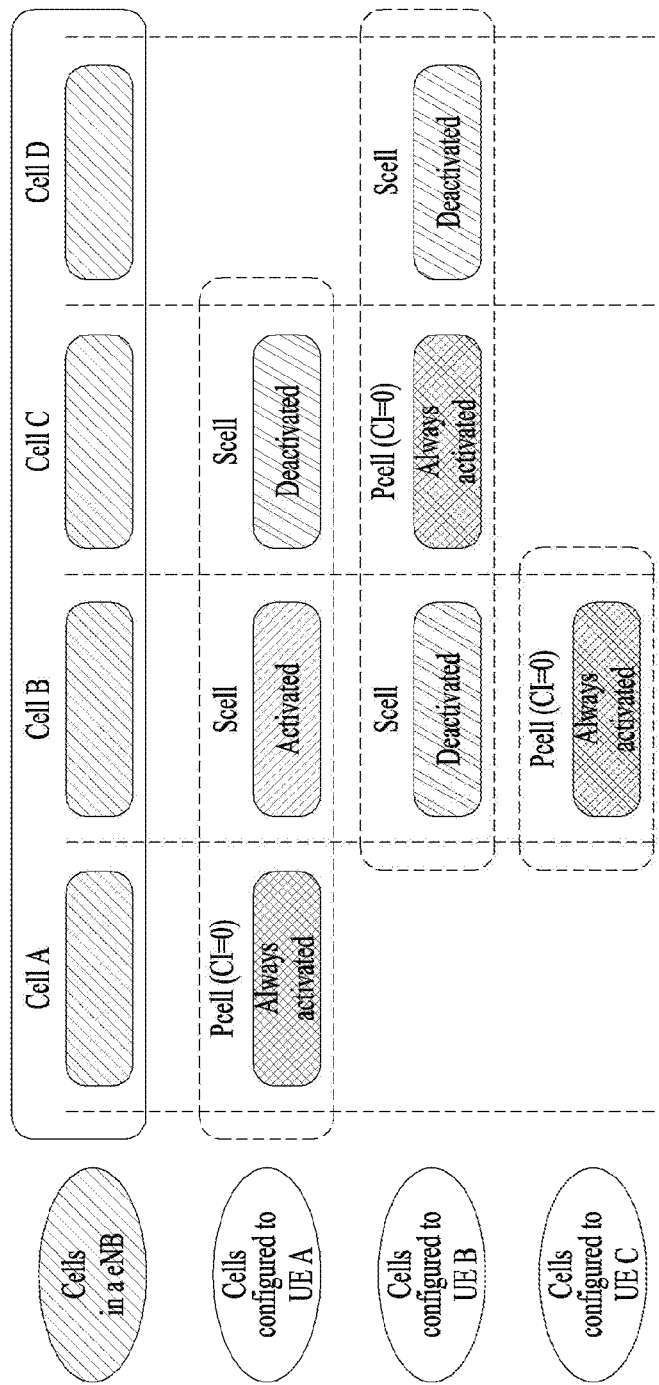
FIG. 6 illustrates the state of cells in a system supporting carrier aggregation (CA).

FIG. 6 illustrates the state of cells in a system supporting CA.

In FIG. 6, a configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. For reference, in FIG. 6, CI denotes a serving cell index and CI=0 is applied to Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the other hand, in a multi-carrier system, a plurality of serving cells may be configured, and therefore UL/DL grants may be allowed to be transmitted in a serving cell with a good channel condition. In this way, scheduling for a case where a cell for carrying UL/DL grant, which is scheduling information, is different from a cell in which UL/DL transmission corresponding to the UL/DL grant is performed is referred to as cross-carrier scheduling.

Hereinafter, a case where a cell is scheduled by the cell itself, and a case where a cell is scheduled by another cell are referred to as self-CC scheduling and cross-CC scheduling, respectively. A scheduling cell may be configured to at least schedule itself. That is, the scheduling cell may be its own scheduled cell.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling).

As more communication devices demand larger communication capacity, efficient use of a limited frequency band in a future wireless communication system becomes increasingly important. Even in a cellular communication system such as a 3GPP LTE/LTE-A system, a method of using, for traffic offloading, an unlicensed band such as a band of 2.4 GHz used by a legacy Wi-Fi system or an unlicensed band such as a band of 5 GHz, which is newly in the spotlight, is under consideration.

Basically, since the unlicensed band is based on wireless transmission/reception through contention between communication nodes, it is necessary for each communication node to confirm that other communication nodes do not perform signal transmission by performing channel sensing before signal transmission. This procedure is called clear channel assessment (CCA). Even an eNB or a UE of the LTE system needs to perform CCA for signal transmission in the unlicensed band (hereinafter, referred to as an LTE-U band). While the eNB or the UE of the LTE system transmits a signal, other communication nodes such as a Wi-Fi node should not create interference by performing CCA. For example, in Wi-Fi standards (e.g. 801.11ac), a CCA threshold is specified as −62 dBm with respect to a non-Wi-Fi signal and as −82 dBm with respect to a Wi-Fi signal, which means that an STA or an AP does not perform signal transmission so as not to create interference when a signal other than the Wi-Fi signal is received at a power of −62 dBm or more. Characteristically, in a Wi-Fi system, the STA or the AP may perform CCA and perform signal transmission, unless signals greater than the CCA threshold are detected for 4 μs or more.

In the CA situation of the LTE-A band and the LTE-U band, the eNB may transmit a signal to the UE or the UE may transmit a signal to the eNB. In the following description, it is assumed that the UE is configured to perform radio communication through two component carriers (CCs) configured respectively in the licensed band and the unlicensed band. Here, as an example, the carrier in the licensed band may be configured as a primary component carrier, and the carrier in the unlicensed band may be configured as a secondary component carrier. However, embodiments of the present invention may also be applied to a case where a plurality of licensed bands and a plurality of unlicensed bands are used through the carrier aggregation technique and to a case where signal transmission/reception between an eNB and a UE is performed only in a unlicensed band. In addition, the embodiments of the present invention may be extensively applied not only to the 3GPP LTE/LTE-A system but also to systems having other characteristics.

Hereinafter, for convenience of description, a cell that is configured in a licensed band for 3GPP LTE/LTE-A and operates by a 3GPP LTE/LTE-A scheme will be referred to as an Lcell and a cell that is configured in an unlicensed band operating by an LTE-U scheme and operates by the LTE-U scheme will be referred to as a Ucell.

In order for an eNB and a UE to perform communication in the LTE-U band which is an unlicensed spectrum, the eNB and the UE should occupy/secure the corresponding band for a specific time duration through contention with other communication (e.g. Wi-Fi) systems which are not associated with the LTE/LTE-A system. Hereinafter, the time duration occupied/secured for communication in the LTE-U band will be referred to as a reserved resource period (RRP), for convenience. To secure the RRP, various methods may be used. Typically, there may be a method of transmitting a specific reservation signal so that other communication system devices such as a Wi-Fi device may recognize that a corresponding radio channel is busy, or continuously transmitting an RS and a data signal so that a signal of a specific power level or more may be seamlessly transmitted during the RRP.

The RRP may be configured based on carrier sensing performed by the eNB. If the eNB has determined the RRP during which the eNB desires to occupy the LTE-U band in advance, the eNB may pre-inform the UE of the RRP so that the UE may maintain a communication transmission/reception link during the indicated RRP. As a scheme of informing the UE of information about the RRP, the eNB may transmit the information about the RRP through another CC (e.g. the LTE-A band) connected in the form of carrier aggregation.

An entity for determining the RRP may differ according to whether transmission is performed on DL or UL. For example, the RRP for DL transmission (hereinafter, a DL RRP) may be determined by the eNB based on carrier sensing performed by the eNB. The RRP for UL transmission (a UL RRP) may be determined by the eNB based on carrier sensing performed by the eNB and then indicated to the UE. Alternatively, the UE may confirm or determine the UL RRP in units of subframes by confirming a channel state, i.e. through carrier sensing performed by the UE, prior to signal transmission.

On a cell used for legacy carrier aggregation, i.e. on an Lcell, an RS for channel synchronization or an RS for channel measurement, such as a PSS/SSS/PBCH, a CRS, and/or a CSI-RS, appears periodically and continuously. In contrast, on a Ucell, the eNB may configure the RRP only when the Ucell is in an idle state and transmit the RS for channel measurement in the RRP. Therefore, the synchronization/measurement RSs will appear aperiodically and/or discontinuously on the Ucell.

Meanwhile, on the Lcell, although the UE is configured to detect the RS(s) or perform synchronization or measurement using the RS(s) for a time duration while the Lcell is activated, the RS(s) may be transmitted for a time duration while the Lcell is inactivated. The synchronization/measurement RS(s) are continuously transmitted regardless of activation or inactivation of the Lcell but the UE is configured to detect the synchronization/measurement RSs only for a time duration during which the Lcell is activated. Unlike this, on the Ucell, the eNB transmits the synchronization or measurement RS(s) only during the RRP and, in principle, does not transmit synchronization or measurement RS(s) during a non-RRP because a wireless communication medium is occupied by other devices during the non-RRP.

As another example of an operation in the LTE-U band which operates by a contention-based random access scheme, the eNB may first perform carrier sensing (CS) before transmitting/receiving data. The eNB may check whether a current channel state of an SCell is busy or idle. If it is determined that the current channel state is idle, the eNB may transmit a scheduling grant through a PDCCH of a PCell (i.e. through cross carrier scheduling (CCS)) or through a PDCCH of the SCell and attempt to transmit/receive data. In this case, for example, the eNB may configure an RRP including M consecutive subframes (SFs). Here, the eNB may pre-inform the UE of the M value and usage of the M SFs through higher layer signaling (using the PCell) or through a physical control/data channel. A start timing of the RRP may be periodically or semi-statically configured through higher layer signaling. If the start timing of the RRP should be set to SF #n, the start timing of the RRP may be designated through physical layer signaling in SF #n or SF #(n−k).

FIG. 7 illustrates a subframe configuration of an RRP.

The RRP may be configured such that boundaries of subframe(s) constituting the RRP are aligned with boundaries of subframe(s) configured on a Pcell, as illustrated in FIG. 7(a), or such that the boundaries of the subframe(s) constituting the RRP are misaligned with the boundaries of the subframe(s) configured on the Pcell, as illustrated in FIG. 7(b).

As described above, in an LTE-U system that operates on a contention basis through carrier sensing in an unlicensed band, an available (e.g. usable for data transmission/scheduling) resource duration may be aperiodically secured/configured according to a carrier sensing result. When a cell/carrier operating according to the above LTE-U scheme is referred to as a Ucell, for convenience, and a resource duration aperiodically configured on the Ucell is defined as an RRP, if the RRP is secured on the Ucell, a situation may be considered in which an eNB opportunistically schedules data transmission to a UE for which the Ucell is configured only during the RRP.

Figure 8:
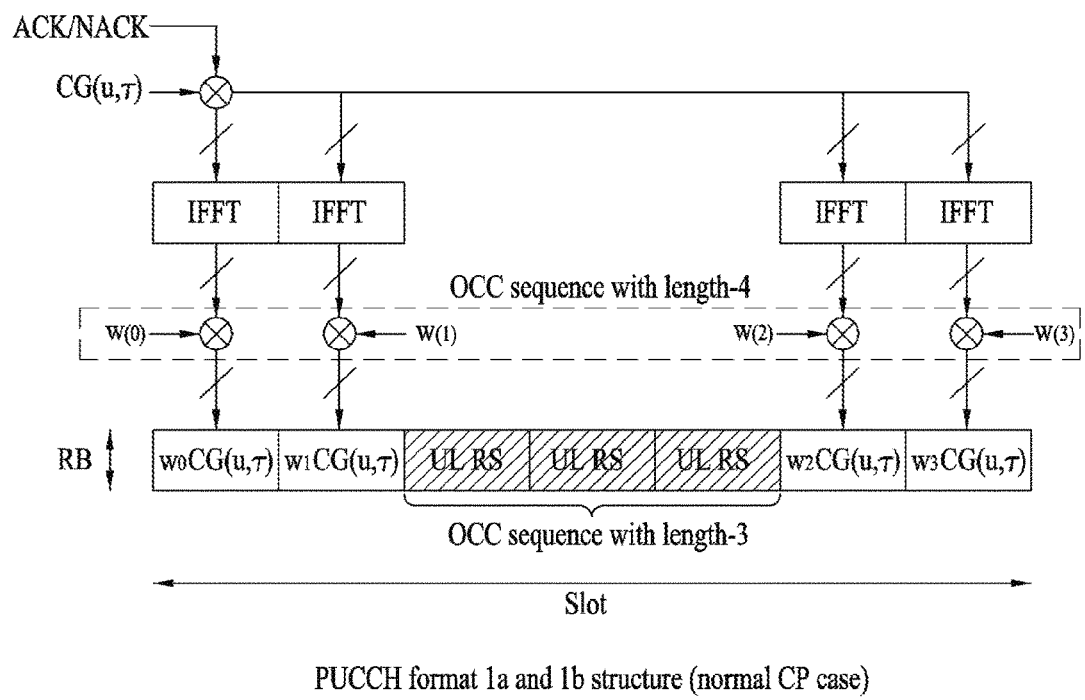
FIG. 8 illustrates a slot level structure of a PUCCH format.

FIG. 8 exemplarily shows slot level structures of a PUCCH format. Particularly, FIG. 8 shows the PUCCH format 1a and 1b structure in case of a normal CP.

In the PUCCH format 1a and 1b structure, the same control information is repeated per slot within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of CSs is 6 and the number of OCs is 3, a total of 18 UEs may be multiplexed in the same PRB on the basis of one antenna. Orthogonal sequences [w(0) w(1) w(2) w(3)] may be applied to either an arbitrary time domain (after FFT modulation) or an arbitrary frequency domain (before FFT modulation).

For an SR and persistent scheduling, ACK/NACK resources including CSs, OC sequences, and PRBs may be provided to a UE through RRC. For dynamic ACK/NACK and non-persistent scheduling, ACK/NACK resources may be implicitly provided to the UE by the lowest Control Channel Element (CCE) index of a PDCCH corresponding to a PDSCH.

The UE may receive a PDCCH indicating an SPS release or one or more PDSCHs in M subframes (SFs) (M≥1). Each PDSCH signal may include one or more (e.g., two) transport blocks (TB) depending on the transmission mode. If there is a PDSCH signal and/or an SPS release PDCCH signal in M DL subframes, the UE performs transmits ACK/NACK through one UL subframe corresponding to the M DL subframes through operations for ACK/NACK transmission (e.g., ACK/NACK (payload) generation, ACK/NACK resource allocation). The ACK/NACK includes reception response information about the PDSCH signal and/or the SPS release PDCCH signal. The ACK/NACK is basically transmitted through the PUCCH, but if the PUSCH is allocated at the time of ACK/NACK transmission, the ACK/NACK is transmitted through the PUSCH. When a plurality of CCs is configured for the UE, the PUCCH is transmitted only on the Pcell and the PUSCH is transmitted on the scheduled CC. Various PUCCH formats may be used for ACK/NACK transmission. Various methods such as ACK/NACK bundling, ACK/NACK channel selection (CH-sel) may be used to reduce the number of ACK/NACK bits.

In the FDD, M=1. In the TDD, M is an integer greater than or equal to 1. In the TDD, the relationship between M DL subframes and a UL subframe in which the ACK/NACK is transmitted is given by a Downlink Association Set Index (DASI).

Table 3 shows DASI (K:$\{k_0, k_1, \ldots, k_{M-1}\}$) defined in LTE(-A). If there is a PDCCH indicating PDSCH transmission and/or SPS release (Semi-Persistent Scheduling release) in subframe n−k (k∈K), the UE transmits ACK/NACK in subframe n. In FDD, DASI (for simplicity, $d_F$)=4.

TABLE 3

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In operating in the TDD scheme, the UE must transmit ACK/NACK signals for one or more DL transmissions (e.g., PDSCH) received through M DL subframes (SF) through one UL SF.

A plurality of ACK/NACKs for a plurality of PDSCHs transmitted in a plurality of cells and/or a plurality of DL SFs may be transmitted through a specific cell (e.g., Pcell for PUCCH) in a UL subframe corresponding to the corresponding DL SF(s). A scheme (i.e., full ACK/NACK) in which a plurality of ACK/NACKs corresponding to the maximum number of codewords (CWs) (or the number of cells when CW bundling described below is applied) that may be transmitted through all cells configured for the UE is configured as one payload for all subframes (SFs) and transmitted through a specific PUCCH format (e.g., PUCCH format 3) and a scheme of transmitting ACK/NACK for a plurality of DL SFs through one PUCCH format 1a/1b resource may be considered. The scheme of transmitting ACK/NACK for a plurality of DL SFs through one PUCCH format 1a/1b resource is configured as follows.

1) ACK/NACK bundling: ACK/NACK bits for a plurality of data units (e.g., PDSCH, semi-persistent scheduling (SPS) release PDCCH, etc.) is combined by a logical operation (e.g., logical AND operation). For example, if all data units are successfully decoded, the receiving terminal (e.g., UE) transmits an ACK signal. On the other hand, if any one of the data units fails to be decoded (or detected), the UE transmits a NACK signal or transmits nothing. ACK/NACK bundling may be applied to the codeword (CW) domain and/or cell domain and/or subframe domain. CW bundling refers to applying ACK/NACK bundling for CW to each cell for each DL subframe (SF), and cell bundling refers to applying ACK/NACK bundling for all or some cells to each DL SF. SF bundling refers to applying ACK/NACK bundling for all or some DL SFs to each cell. An ACK-counter scheme may be considered, in which indicates the total number of ACKs (or the number of some ACKs) for each cell is signaled for PDSCH or DL grant PDCCH received for each cell.

2) Channel selection (CHsel): A UE receiving a plurality of data units (e.g., PDSCH, SPS release PDCCH, etc.) occupies a plurality of PUCCH resources to perform ACK/NACK transmission. The ACK/NACK response for a plurality of data units is identified by a combination of the PUCCH resource actually used for ACK/NACK transmission and the transmitted ACK/NACK content (e.g., the bit value, the QPSK symbol value). The channel selection scheme is also referred to as an ACK/NACK selection scheme and a PUCCH selection scheme. For example, for PUCCH format 1b for 2-bit ACK/NACK feedback, four PUCCH resources (PUCCH resources #0 to #4) may be configured. If 4-bit ACK/NACK information is transmitted, 2 bits of the 4-bit ACK/NACK information may be represented by 2-bit information carried by PUCCH format 1b and the other 2 bits may be represented by a resource selected among the four PUCCH resources. For example, it may be predefined that transmission of the UCI using the PUCCH resource #0 indicates '00', and transmission of the UCI using the PUCCH resource #1 indicates '01'. Thus, as 2 bits (00, 01, 10, or 11) may be represented by selecting one of the four PUCCH resources, additional 2-bit ACK/NACK information may be represented together with the 2-bit ACK/NACK information represented through PUCCH format 1b.

The bit to be transmitted on a certain PUCCH resource in each ACK/NACK state may be predetermined. That is, a table of mapping of the ACK/NACK states onto the PUCCH resources and onto the transmission bits (or the complex modulation symbols) may be predefined and pre-stored in the eNB and the UE.

In accordance with a predefined mapping table, the UE may transmit transmission bit(s) b(0)b(1) on PUCCH resource $n^{(1)}_{PUCCH}$ selected from among the A (A=2, 3, 4) PUCCH resources, $n^{(1)}_{PUCCH,j}$ (where $0 \leq j \leq A-1$) in SF n using PUCCH format 1b to inform the eNB of the ACK/NACK state.

Figure 9:
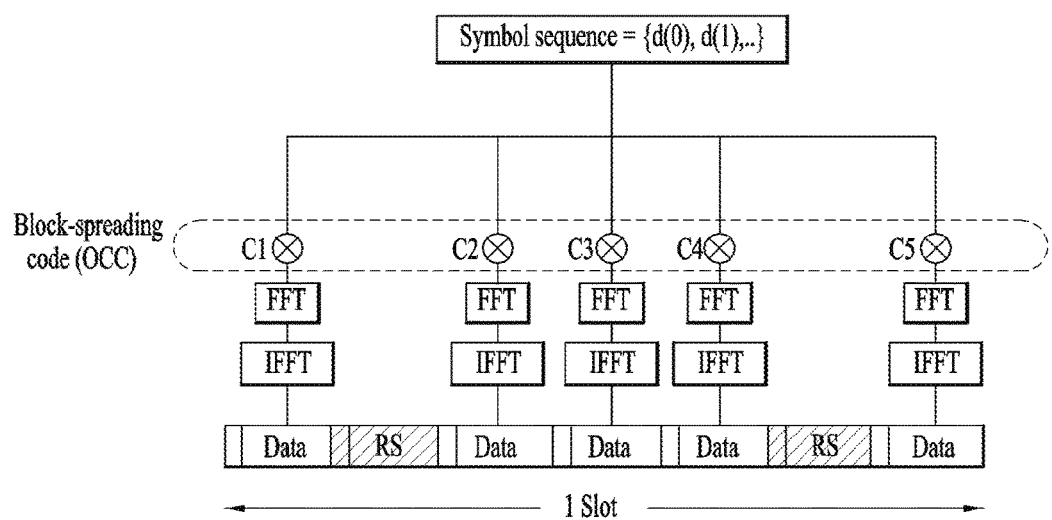
FIG. 9 illustrates a PUCCH format based on block-spreading.

FIG. 9 illustrates a PUCCH format based on block spreading.

A block spreading scheme is to transmit a symbol sequence after spreading the symbol sequence in the time domain by an orthogonal cover code (OCC) (also called an orthogonal sequence). According to the block spreading scheme, control signals of multiple UEs may be multiplexed in the same RB by the OCC and then transmitted to an eNB. In PUCCH format 2, one symbol sequence is transmitted in the time domain, wherein UCI of the UEs is multiplexed using a cyclic shift of a CAZAC sequence (i.e. CCS) and then transmitted to the eNB. On the other hand, in a block spreading based new PUCCH format (hereinafter, PUCCH format 3), one symbol sequence is transmitted in the frequency domain, wherein the UCI of the UEs is multiplexed using OCC based time-domain spreading and then transmitted to the eNB. Referring to FIG. 9 as an example, one symbol sequence is spread by a length-5 (i.e. SF=5) OCC and then mapped to 5 SC-FDMA symbols. Although a total of 2 RS symbols is used during one slot in FIG. 9, 3 RS symbols may be used and an OCC of SF=4 may be used for spreading of the symbol sequence and multiplexing of the UEs. Here, the RS symbols may be generated from a CAZAC sequence having a specific cyclic shift and may be transmitted in a form of applying (multiplying) a specific OCC to a plurality of RS symbols in the time domain. In FIG. 9, fast Fourier transform (FFT) may be applied in advance before the OCC and discrete Fourier transform (DFT) may be applied instead of FFT.

For convenience of description, such a channel coding based scheme for transmitting a plurality of ACK/NACK signals using PUCCH format 2 or PUCCH format 3 is referred to as a "multi-bit ACK/NACK coding" transmission method. This method indicates a method for transmitting an ACK/NACK coded block generated by channel-coding ACK/NACK information or DTX information (indicating that a PDCCH has not been received/detected) for PDSCH(s) of multiple DL CCs, i.e. PDSCH(s) transmitted on multiple DL CCs. For example, if the UE receives two codewords (CWs) by operating in a single user MIMO (SU-MIMO) mode on any DL CC, the UE may transmit one of a total of 4 feedback states of ACK/ACK, ACK/NACK, NACK/ACK, and NACK/NACK per CW on the DL CC or one of a maximum of 5 feedback states including DTX. If the UE receives a single CW, there may be a maximum of 3 states of ACK, NACK, and DTX (if NACK and DTX are identically processed, there may be a total of two states of ACK and NACK/DTX). Accordingly, if a maximum of 5 DL CCs are aggregated for the UE and the UE operates in an SU-MIMO mode on all CCs, there may be a maximum of $5^5$ transmittable feedback states and the size of an ACK/NACK payload for representing these states is a total of 12 bits. If DTX and NACK are identically processed, the number of feedback states is $4^5$ and the size of the ACK/NACK payload for representing these states is a total of 10 bits.

For PUCCH format 3, the UE uses PUCCH resource $n^{(3,p\sim)}_{PUCCH}$ or $n^{(1,p\sim)}_{PUCCH}$ to transmit HARQ-ACK in subframe n for p~ mapped to antenna port p.

The UE is allocated a PUCCH resource for transmission of UCI from an eNB by an higher layer signal, a dynamic control signal, or in an implicit manner. The physical resources used for PUCCH depends on two parameters, $N^{(2)}_{RB}$ and $N^{(1)}_{cs}$, given by higher layers. Variable $N^{(2)}_{RB} \geq 0$ denotes the bandwidth available for PUCCH format 2/2a/2b transmission in each slot, expressed as an integer multiple of $N^{RB}_{sc}$. The variable $N^{(1)}_{cs}$ denotes the number of cyclic shift used for PUCCH formats 1/1a/1b in a resource block used for a mix of formats 1/1a/1b and 2/2a/2b. The value of $N^{(1)}_{cs}$ is an integer multiple of $\Delta^{PUCCH}_{shift}$ within the range of $\{0, 1, \ldots, 7\}$, $\Delta^{PUCCH}_{shift}$ is provided by higher layers. No mixed resource block is present if $N^{(1)}_{cs}=0$. At most one resource block in each slot supports a mix of formats 1/1a/1b and 2/2a/2b. Resources used for transmission of PUCCH formats 1/1a/1b, 2/2a/2b and 3 are represented by the non-negative indices $n^{(1,\tilde{p})}_{PUCCH}$, $n^{(2,\tilde{p})}_{PUCCH}<N^{(2)}_{RB}\cdot N^{RB}_{sc}+\text{ceil}(N^{(1)}_{cs}/8)\cdot(N^{RB}_{sc}-N^{(1)}_{cs}-2)$, and $n^{(3,\tilde{p})}_{PUCCH}$, respectively.

Specifically, an orthogonal sequence and/or a cyclic shift to be applied to corresponding UCI is determined from a PUCCH resource index according to a specific rule predefined for each PUCCH format, and resource indexes of two resource blocks in a subframe to which a PUCCH is mapped are given. For example, the PRBs to be used for transmission of PUCCH in $n_s$ are given by the following equation.

$$n_{PRB} = \begin{cases} \left\lfloor \frac{m}{2} \right\rfloor & \text{if } (m+n_s\text{mod}2)\text{mod}2 = 0 \\ N^{UL}_{RB} - 1 - \left\lfloor \frac{m}{2} \right\rfloor & \text{if } (m+n_s\text{mod}2)\text{mod}2 = 1 \end{cases} \quad \text{Equation 1}$$

where the variable m depends on the PUCCH format. PUCCH format 1/1a/1b, PUCCH format 2/2a/2b, and PUCCH format 3 are given by Equation 2, Equation 3 and Equation 4, respectively.

$$m = \begin{cases} N^{(2)}_{RB} & \text{if } n^{(1,\tilde{p})}_{PUCCH} < c \cdot N^{(1)}_{cs}/\Delta^{PUCCH}_{shift} \\ \left\lfloor \frac{n^{(1,\tilde{p})}_{PUCCH} - c \cdot N^{(1)}_{cs}/\Delta^{PUCCH}_{shift}}{c \cdot N^{RB}_{sc}/\Delta^{PUCCH}_{shift}} \right\rfloor + \text{otherwise} \\ N^{(2)}_{RB} + \left\lceil \frac{N^{(1)}_{cs}}{8} \right\rceil \end{cases} \quad \text{Equation 2}$$

$$c = \begin{cases} 3 & \text{normal cyclic prefix} \\ 2 & \text{extended cyclic prefix} \end{cases}$$

In Equation 2, $n^{(1,\tilde{p})}_{PUCCH}$ is a PUCCH resource index of an antenna port p for PUCCH format 1/1a/1b. For ACK/NACK PUCCH, it is implicitly determined by the first CCE index of the PDCCH carrying scheduling information on the corresponding PDSCH.

$$m = \lfloor n_{PUCCH}^{(1,\tilde{p})}/N^{RB}_{sc} \rfloor \quad \text{Equation 3}$$

$n^{(2)}_{PUCCH}$ is a PUCCH resource index of an antenna port p for PUCCH format 2/2a/2b, and the value thereof is transmitted from the eNB to the UE by higher layer signaling.

$$m = \lfloor n_{PUCCH}^{(3,\tilde{p})}/N^{PUCCH}_{SF,0} \rfloor \quad \text{Equation 4}$$

$n^{(3)}_{PUCCH}$ is a PUCCH resource index of an antenna port p for PUCCH format 2/2a/2b, and the value thereof is transmitted from the eNB to the UE by higher layer signaling. $N^{PUCCH}_{SF,0}$ denotes the spreading factor (SF) for the first slot of a subframe. $N^{PUCCH}_{SF,0}$ is 5 for both 2 slots in a subframe using general PUCCH format 3. $N^{PUCCH}_{SF,0}$ is 5 and 4 for the first and second slots in a subframe using reduced PUCCH format 3.

Referring to Equation 2, a PUCCH resource for ACK/NACK is not pre-allocated to each UE, and but a plurality of PUCCH resources is allocated to a plurality of UEs in a cell at every point of time. Specifically, a PUCCH resource used by the UE to transmit the ACK/NACK is dynamically determined based on the PDCCH carrying the scheduling information on the PDSCH carrying the corresponding downlink data or the PDCCH indicating SPS release. A region in which the PDCCH is transmitted in each DL subframe includes a plurality of control channel elements (CCEs), and the PDCCH transmitted to the UE consists of one or more CCEs. The UE transmits ACK/NACK through a PUCCH resource linked to a specific CCE (for example, the lowest index CCE) among the CCEs constituting the PDCCH that the UE has received.

Each PUCCH resource index corresponds to a PUCCH resource for ACK/NACK. For example, when it is assumed that the scheduling information on the PDSCH is transmitted to the UE through a PDCCH consisting of the CCEs #4 to #6 and the CCE #4 is linked to the PUCCH resource index 4, the UE transmits an ACK/NACK for the PDSCH to the eNB through PUCCH resource #4 corresponding to CCE #4. Specifically, the PUCCH resource index for transmission by two antenna ports ($p_0$ and $p_1$) in the 3GPP LTE(-A) system is determined as follows.

$$n_{PUCCH}^{(1,\tilde{p}=\tilde{p}0)} = n_{CCE} + N^{(1)}_{PUCCH} \quad \text{Equation 5}$$

$$n_{PUCCH}^{(1,\tilde{p}=\tilde{p}1)} = n_{CCE} + N^{(1)}_{PUCCH} \quad \text{Equation 6}$$

Here, $n^{(1,\tilde{p}=\tilde{p}0)}_{PUCCH}$ denotes a PUCCH resource index (i.e. number) to be used by antenna port $p_0$, $n^{(1,\tilde{p}=\tilde{p}1)}_{PUCCH}$ denotes a PUCCH resource index to be used by antenna port $p_1$, and $N^{(1)}_{PUCCH}$ denotes a signaling value received from higher layer. $n_{CCE}$ is the lowest of CCE indexes used for PDCCH transmission. For example, when the CCE aggregation level is higher than or equal to 2, the first CCE index among indexes of a plurality of aggregated CCEs for PDCCH transmission is used in determining an ACK/NACK PUCCH resource. The cyclic shift (CS), orthogonal code (OC) and PRB for the PUCCH format are obtained from $n^{(1)}_{PUCCH}$.

When PUCCH format 3 is configured for ACK/NACK transmission, a specific one of the PUCCH format 3 resource indexes ($n^{(3)}_{PUCCH}$) allocated by an higher layer (e.g., RRC) may be indicated by an ACK/NACK resource indicator (ARI) value of the DL grant PDCCH (explicit PUCCH resource). The ARI is transmitted through the TPC field of the PDCCH that schedules PDSCH of the Scell. The OC and PRB for PUCCH format 3 are obtained from $n^{(3)}_{PUCCH}$.

In the case of EPDCCH-based scheduling, the ACK/NACK transmission resource for the DL data scheduled by the DL grant EPDCCH may be determined as a PUCCH resource linked to a specific ECCE index (e.g., minimum ECCE index) constituting the DL grant EPDCCH and an ECCE index obtained by adding a specific offset value to the specific ECCE index. In addition, the ACK/NACK feedback transmission resource may be determined as a PUCCH resource linked to a specific ECCE index (e.g., a minimum ECCE index) constituting the DL grant EPDCCH or a PUCCH resource obtained by adding a specific offset value to the specific ECCE index. Here, the specific offset value may be determined by a value directly signaled through the ARO (ACK/NACK Resource Offset) field in the DL grant EPDCCH and/or a value designated dedicatedly for each antenna port. Specifically, the information signaled through the TPC field and the ARO field in the DL grant EPDCCH according to the frame structure type (e.g., FDD or TDD) and the ACK/NACK feedback transmission scheme (e.g., PUCCH format 3 or channel selection) may be configured as follows. For simplicity, the TPC command for PUCCH power control is defined as "TPC value", an offset value added in determining an implicit PUCCH index is defined as "ARO value", and the ARI indicating a specific one of a plurality of PUCCH format 3 indexes or a plurality of PUCCH format 1 indexes (a plurality of PUCCH format 1 index groups) allocated through RRC is defined "ARI value". A fixed value (e.g., '0') that is inserted without any information (for use such as virtual CRC) is defined as a "fixed value".

The remaining PUCCH resource(s) for SR, ACK/NACK and/or CSI other than the (ACK/NACK) PUCCH resource(s) determined dynamically (i.e., implicitly) on the Pcell in the UL subframe corresponding to the ACK/NACK transmission timing for the DL subframe by detecting the PDCCH/EPDCCH on the Pcell in the DL subframe are configured by a higher layer.

Figure 10:
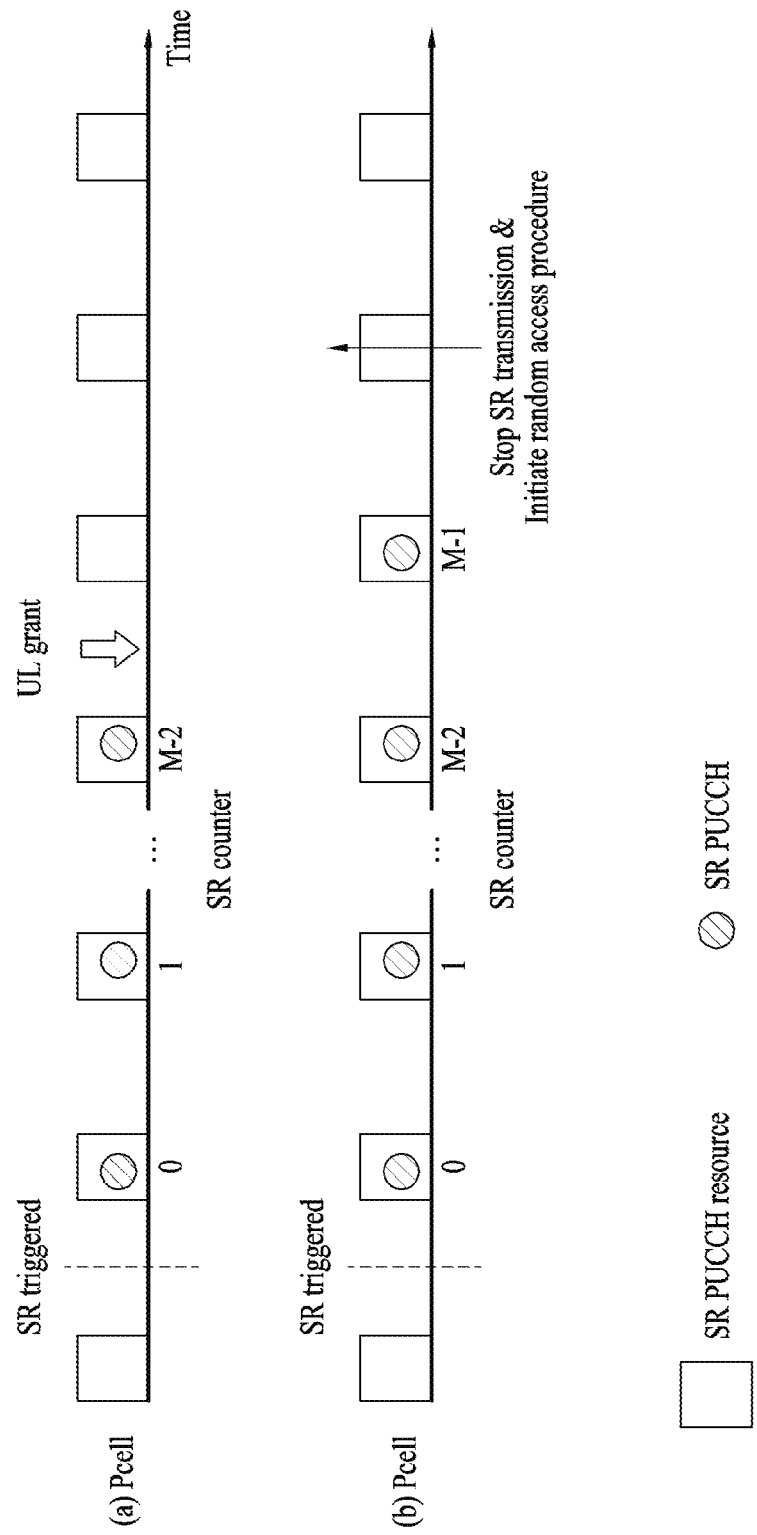
FIG. 10 illustrates an uplink scheduling request procedure.

FIG. 10 illustrates an uplink scheduling request procedure.

A scheduling request (SR) is used to request an uplink resource for transmission of a new UL-SCH.

The UE may be configured by a higher layer so as to transmit an SR on one or two antenna ports. For example, SR configuration information is provided to the UE through a higher layer signal. The SR configuration information may include dsr-TransMax, which is information about the maximum number of times of transmission of a triggered SR, $I_{SR}$, which is information indicating a subframe in which the SR PUCCH resource is reserved, $n^{(1,p)}_{PUCCH,SRI}$, which is information indicating the SR PUCCH resource. The SR is transmitted on PUCCH resource(s) $n^{(1,p)}_{PUCCH} = n^{(1,p)}_{PUCCH,SRI}$ for antenna port p, where $n^{(1,p)}_{PUCCH,SRI}$ is configured by a hither layer unless the SR and ACK/NACK transmission using PUCCH format 3 is triggered simultaneously. If the SR and ACK/NACK transmission using PUCCH format 3 is triggered simultaneously, the SR is multiplexed with the ACK/NACK.

The SR transmission periodicity $SR_{PERIODICITY}$ and the SR subframe offset $N_{OFFSET,SR}$ are defined in the following table by the SR configuration index $I_{SR}$ given by the higher layer.

TABLE 4

| SR configuration Index $I_{SR}$ | SR periodicity (ms) $SR_{PERIODICITY}$ | SR subframe offset $N_{OFFSET,SR}$ |
|---|---|---|
| 0~4 | 5 | $I_{SR}$ |
| 5~14 | 10 | $I_{SR}$ -5 |
| 15~34 | 20 | $I_{SR}$ -15 |
| 35~74 | 40 | $I_{SR}$ -35 |
| 75~154 | 80 | $I_{SR}$ -75 |
| 155~156 | 2 | $I_{SR}$ -155 |
| 157 | 1 | $I_{SR}$ -157 |

SR may be transmitted in UL subframes satisfying $\{10*n_f+\text{floor}(n_s/2)-N_{OFFSET,SR}\} \mod SR_{PERIODICITY}=0$. Here, $n_f$ is the frame number and $n_s$ is the slot number in a radio frame.

Referring to FIG. 10, when an SR is triggered, the UE transmits the SR using an SR PUCCH resource in a subframe in which the SR PUCCH resource is reserved for the UE. The UE transmits the SR by increasing the SR counter from 0 by 1 until receiving the UL grant for the SR.

Referring to FIG. 10(a), if the UL grant is received before the SR counter reaches the maximum number of SR transmissions M configured by the higher layer, i.e., SR Counter≥M, the SR transmission is canceled (i.e., terminated) and the UE may transmit UL data using the PUSCH resource allocated by the UE grant, as long as there is no other pending SR.

Referring to FIG. 10(b), if the UL grant is not received until the SR counter reaches the maximum number of SR transmissions M configured by the higher layer, the UE cancels the SR transmission and initiates the random access procedure. For example, if the UE transmits an SR corresponding to SR Counter=M−1 and does not receive an UL grant, the SR transmission may be canceled and a random access response may be initiated in the next subframe in which the SR PUCCH resource is reserved.

Figure 11:
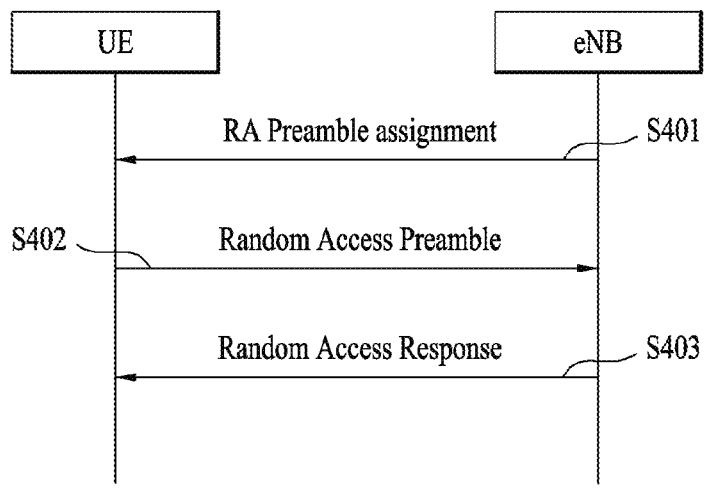
FIGS. 11 and 12 illustrate a random access procedure.
Figure 12:
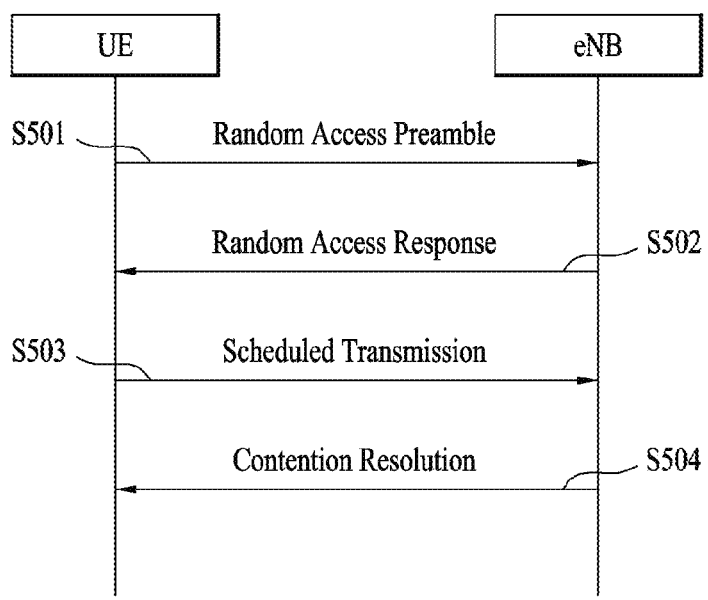

FIGS. 11 and 12 illustrate a random access procedure.

The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

Referring to FIG. 11, the dedicated random access procedure includes the following three steps. Hereinafter, the messages transmitted in Steps 0 to 2 may be referred to as Messages 0 to 2 (Msg0 to Msg2), respectively. Although not shown, uplink transmission corresponding to the RAR (i.e., step 3) may also be performed as part of the random access procedure. The dedicated random access procedure can be triggered using a PDCCH (hereinafter, referred to as PDCCH order) used for an eNB to command RACH preamble transmission.

Step 0 (S401): PACH preamble allocation through dedicated signaling (eNB to UE)

Step 1 (S402): RACH preamble (via PRACH) (UE to eNB)

Step 2 (S403): random access response (RAR) (via PDCCH and PDSCH) (eNB to UE)

Referring to FIG. 12, the contention-based random access procedure has the following four steps. Hereinafter, messages transmitted in steps 1 to 4 may be respectively referred to as Msg 1 to Msg 4.

Step 1 (S501): RACH preamble (via PRACH) (UE to eNB)

Step 2 (S502): random access response (RAR) (via PDCCH and PDSCH) (eNB to UE)

Step 3 (S503): Layer 2/Layer 3 message (via PUSCH) (UE to eNB)

Step 4 (S504): contention resolution message (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc. The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg 3 after transmission of Msg 3.

Since the PDCCH order carries information on the RACH preamble to be used in the random access procedure and the RACH preamble according to the PDCCH order is used for the random access procedure initiated by the PDCCH order, this random access procedure may be referred to as a dedicated random access procedure, namely, non-contention based random access procedure. On the other hand, the random access procedure in FIG. 10(b) is not a random access procedure initiated by the PDCCH order, and thus may be regarded as a contention based random access procedure for which an arbitrary RACH preamble is used.

When a plurality of cells is configured for the UE, the LTE-A system commonly applies a timing advance (TA) value applicable to one specific cell (e.g., PCC or Pcell) to the plurality of cells. However, cells belonging to different frequency bands (i.e., largely spaced from each other in the frequency domain) may be carrier aggregated, or carrier aggregated cells may have different propagation characteristics. Further, in the case of a particular cell, devices such as RRH may be disposed in the cell to expand the coverage or remove coverage holes. In this case, UL transmission using a scheme of commonly applying one TA value to a plurality of cells subjected to carrier aggregation may seriously affect synchronization of the UL signals transmitted on the plurality of cells.

The UE may be configured with two cells (e.g., PCell and SCell), and a UL signal may be transmitted by applying different TAs to the cells. For example, TA 1 may be applied to UL transmission of the PCell, and TA 2 may be applied to UL transmission of the SCell. The transmission end time of the UL subframe/signal (e.g., PUSCH, PUCCH, SRS, etc.) may be advanced by TA with respect to the reception end time of the DL subframe. Equivalently, the transmission start time of the UL subframe/signal (e.g., PUSCH, PUCCH, SRS, etc.) may be advanced by TA with respect to the reception start time of the DL subframe.

Thus, it may be considered to allocate TA independently for each cell group/unit. Hereinafter, a group of cells which are configured by a higher layer (e.g., RRC) and use the same timing reference cell and the same TA value for UL-configured cells, will be referred to as a TA group (TAG). The TAG may include one or more cells (CCs). One TA may be commonly applied to the cell(s) in a TAG. The TAG may be divided into a primary TAG (PTAG) including a Pcell and a secondary TAG (STAG) including at least one serving cell having configured UL without including a Pcell. In the case of the PTAG including the Pcell, a TA that is determined based on the Pcell or adjusted through a random access procedure that is performed on the Pcell may be applied to all the cell(s) in the PTAG. On the other hand, in the case of the STAG that does not include a Pcell, i.e., that consists of only Scell(s), a TA determined based on a specific Scell in the STAG may be applied to all Scell(s) in the STAG. To this end, the random access procedure may be performed not only through the Pcell but also through the Scell. The random access procedure performed on an Scell may not be a contention based random access procedure triggered by the UE but may be a non-contention based random access procedure which the eNB triggers using a PDCCH (i.e., PDCCH order) for commanding RACH preamble transmission.

The LTE/LTE-A systems up to now may support CA of up to five cells/carriers/CCs (hereinafter, referred to as cell) for one UE. Except for the case of dual connectivity (DC), a PUCCH carrying UCI (e.g., HARQ-ACK, CSI, etc.) associated with the plurality of cells may be transmitted through the Pcell alone.

Even if the UE is configured with DC, the PUCCH for UCI transmission of the master cell group (MCG) is configured on the Pcell of the MCG, and the PUCCH for UCI transmission of the secondary cell group (SCG) is configured on the Pcell of the SCG. Once the MCG or SCG is configured, the UE in the RRC_connected is configured with DC. Each serving cell of the UE exclusively belongs to the MCG or SCG. If the UE is configured with DC, this substantially means that the UE is connected to two eNBs at the same time. In this case, the MCG may consist of cell(s) managed by an eNB (hereinafter, eNB M) that the UE accesses first between the two eNBs, and the SCG may consist of cell(s) managed by an eNB (hereinafter, eNB S) that the UE is additionally connected after the UE is connected to the eNB M. Since the UE configured with DC is connected to two eNBs, i.e., two schedulers, DL/UL scheduling, UCI transmission, and the like for the MCG are performed only for the cells of the MCG, and DL/UL scheduling, UL scheduling, and the like for the SCG are performed only for the cells of the SCG. Therefore, in the case of cross-carrier scheduling, if the scheduling cell belongs to the MCG, the scheduled cell of the scheduling cell also belongs to the MCG. If the scheduling cell belongs to the SCG, the scheduled cell of the scheduling cell also belongs to the SCG, and cross-scheduling between the cell of the SCG and the cell of the SCG is not performed. In other words, the scheduling cell and the corresponding scheduled cell do not belong to different CGs. In addition, the UE configured with the DC has one Pcell per eNB, i.e., total two Pcells for the two eNB, the UCI for the MCG may be transmitted through the PUCCH on the Pcell of the MCG, and the UCI for the SCG is transmitted through the PUCCH on the Pcell of the SCG. The UCI for the MCG is not allowed to be transmitted on the SCG, and the UCI for the SCG is not allowed to be transmitted on the MCG.

In the future system, it may be considered to support CA for 5 or more cells for one UE for the purpose of a higher data rate. In this case, in order to reduce the PUCCH resource burden on the Pcell according to increase of UCI transmission frequency/size (due to increase in the number of cells constituting CA), enabling transmission of a PUCCH (and transmission of UCI therethrough) through a specific Scell (hereinafter, Acell) (in addition to the Pcell) may be considered. While the Pcell of the MCG and the Pcell of the SCG according to DC are controlled by independent schedulers, the Pcell and Acell according to the present invention are controlled by a single scheduler. Additionally, introduction of a new PUCCH format that may support a payload of a larger size than the legacy PUCCH format (e.g., PUCCH format 3) may be considered in consideration of increase in the UCI size (due to increase in the number of cells constituting CA).

In the conventional CA situation, channel selection (hereinafter, referred to as CHsel) method of the PUCCH format 1b or PUCCH format 3 (hereinafter, referred to as PF3)-based method may be configured as the HARQ-ACK (hereinafter, referred to as A/N) feedback transmission scheme. First, CHsel is basically applicable only to a situation where two cells are subjected to CA, and a specific one of a plurality of PUCCH format 1b (hereinafter, referred to as PF1) resources is selected/modulated according to an A/N combination corresponding to each cell, namely, the A/N state for the entire CA to perform transmission. More specifically, when cross-CC scheduling is configured (such that the Scell is scheduled by the Pcell), the (CHsel Candidate) resources corresponding to each cell may all allocated as implicit PUCCH resources linked to the DL grant transmission resource (e.g., CCE or ECCE). If no cross-CC scheduling is configured, resources corresponding to the Pcell may be allocated to implicit PF1 while resources corresponding to the Scell may be allocated to a specific one of multiple explicit PF1 resources (sets) (pre-)configured through a higher layer (e.g., RRC). For example, a resource corresponding to the Scell may be allocated to a specific explicit PF1 resource (set) indicated by an ACK/NACK resource indicator (ARI) in a DL grant for scheduling the Scell among multiple explicit PF1 resources (sets) (pre-)configured through a higher layer (e.g., RRC).

Unlike CHsel, PF3 is applicable even when up to 5 cells are subjected to CA, and one A/N payload including A/N corresponding to each cell is configured. Coded bits generated by applying a series of coding (Reed Muller (RM) code) procedures to the A/N payload are mapped/transmitted on the PF3 resource. A specific PF3 resource (indicated by, for example, the ARI in the DL grant for scheduling the Scell) among a plurality of PF3 resources (pre-)configured through a higher layer (e.g., RRC) may be allocated as a PF3 resource used for A/N transmission. For example, even in a situation where PF3 is configured, if a DL grant for scheduling only for the Pcell (in the case of FDD) or for only one subframe (SF) (corresponding to DAI=1) in the Pcell (in the case of TDD) is detected, only A/N corresponding to the DL grant may be transmitted using an implicit PF1 resource linked to a PDCCH carrying the DL grant. Otherwise, A/N for all cells subjected to CA may be transmitted using PF3 indicated by ARI. The operation of transmitting only the A/N for the DL grant for scheduling only for the Pcell (in the case of FDD) or for only one SF in the Pcell (in the case of TDD) using the implicit PF1 resource is called fallback.

If the A/N based on the PUCCH format 1a/1b is required to be transmitted in a subframe in which an SR PUCCH is reserved, the UE transmits the ACK/NACK on the allocated ACK/NACK PUCCH resource for negative SR transmission (that is, a case where there is no SR to be transmitted in the corresponding subframe), and transmits the SR on the SR PUCCH resource reserved in the subframe for the positive SR transmission.

Even in the CA situation, UL scheduling request, that is, if simultaneous request for (positive) SR transmission and A/N transmission may be required at the same time. Various types of 'SR+A/N' simultaneous transmission methods may be applied according to an A/N feedback scheme (e.g., CHsel or PF3) and a duplex scheme (e.g., FDD or TDD)

Simultaneous Transmission of A/N+SR Based on CHsel
For FDD: The spatial bundled A/N for each cell is transmitted on the PUCCH resource configured for SR only. That is, the A/N with logical AND operation applied to A/Ns per transmission block or code word is transmitted on a PUCCH resource configured as a resource dedicated to SR.
For TDD: The number of ACKs (e.g., ACK counter) for all data received in multiple cells or multiple SFs is transmitted on the SR PUCCH resource.

Simultaneous Transmission of A/N+SR Based on PF3
For FDD: A 1-bit SR is added to the PF3 payload and transmitted along with the A/N bits corresponding to the entire cells. If only the Pcell is scheduled (i.e., in the case of the fallback), only A/N for the Pcell (hereinafter, referred to as Pcell A/N) is transmitted on the SR PUCCH resource.
For TDD: A 1-bit SR is added to the PF3 payload and transmitted along with the A/N bits corresponding to the entire cells. If only one SF in Pcell (corresponding to DAI=1) is scheduled (i.e., in the case of fallback), only the A/N corresponding to one SF in the Pcell is transmitted on the SR PUCCH resource.

Meanwhile, a situation where additional (A/N) PUCCH transmission is configured in a specific Scell (i.e., Acell) for PUCCH offloading may be considered. In this case, A/N transmission may be basically configured to be performed for each cell group (hereinafter, CG). For example, the UE may be configured to transmit A/N corresponding to a primary cell group (PCG) to which the Pcell belongs through the PUCCH on the Pcell and to transmit A/N corresponding to a secondary cell group (SCG) to which the Acell belongs through the PUCCH on the Acell.

Figure 13:
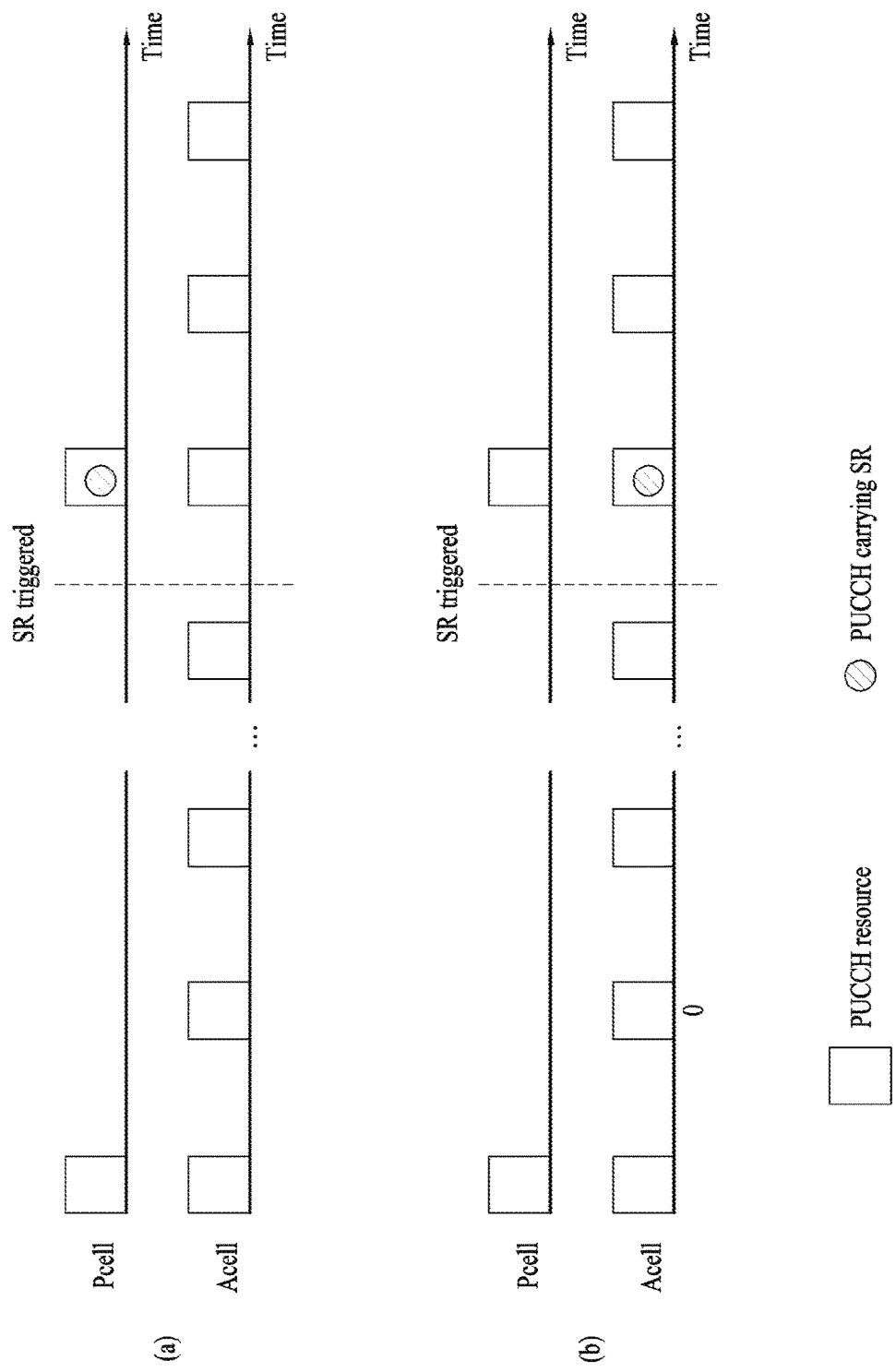
FIGS. 13 and 14 illustrate embodiments of the scheduling request transmission according to the present invention.
Figure 14:
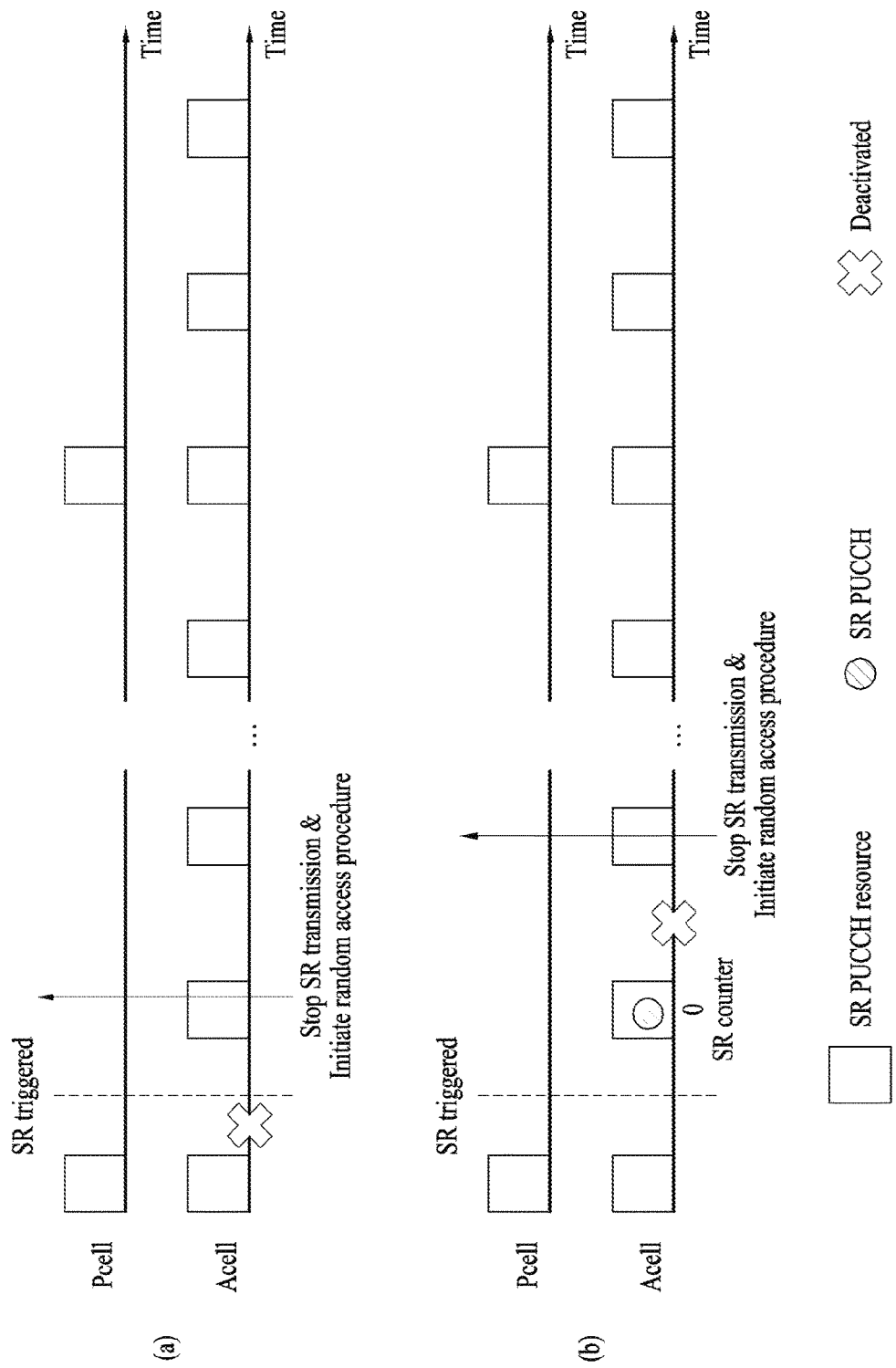

FIGS. 13 and 14 illustrate embodiments of the scheduling request transmission according to the present invention.

For the SR, the conventional method of transmitting the SR through the Pcell PUCCH may be considered. If operation is performed using this method, performance may be deteriorated in the following cases.

Case 1) When the TDD CHsel scheme is configured for the PCG and the FDD CHsel scheme is configured for the SCG, the A/N corresponding to the PCG is always compressed in the form of an ACK counter (having a larger DL throughput loss than spatial bundling) and transmitted only on the SR PUCCH resources on the PCG/Pcell.

Case 2) When the CHsel scheme is configured for the PCG and the PF3 scheme is configured for the SCG, the A/N corresponding to the PCG is always compressed in the form of spatial bundling or ACK counter and transmitted only on the SR PUCCH resources on the PCG/Pcell regardless of PF3 transmission on the SCG/Acell.

Case 3) When PF3 scheme is configured for both the PCG and the SCG, 1-bit SR is added to A/N payload of PCG if there is PF3 transmission on PCG/Pcell. If there is no A/N corresponding to the PCG, SR PUCCH transmission on the PCG/Pcell is required despite the PF3 transmission on the SCG/Acell.

In consideration of Case 1 to Case 3, an embodiment of the present invention provides SR transmission configuration methods Alt 1, Alt 2, or Alt 3 for stably maintaining and improving performance in a CA situation in which PUCCH transmission is configured on the Scell.

Alt 1) SR transmission is configured to be performed only through the PUCCH on the Acell or SCG (hereinafter, Acell/SCG) not on the Pcell or PCG (hereinafter, Pcell/PCG). In this case, the SR PUCCH resource is allocated to the Acell/SCG.

Alt 2) SR transmission is allowed to be performed through both the PUCCH on the Pcell/PCG and the PUCCH on the Acell/SCG. In this case, SR PUCCH resources are allocated to both Pcell/PCG and Acell/SCG.

Alt 3) SR transmission is always allowed to be performed through PF3 irrespective of the cell/CG (with SR PUCCH resources allocated only to a specific cell/CG).

In this specification, PF3 may include a new PUCCH format having a structure of configuring a payload based on UCI bit(s) and mapping/transmitting the corresponding coded bit(s) onto the PUCCH resources (similar to the case of the existing PF3).

In Cases 1/2 among Cases 1 to 3 described above, for example, configuring the SR so as to be transmitted only through the PUCCH on the Acell/SCG, not on the Pcell/PCG (based on Alt 1) may be efficient in terms of reducing A/N compression (thereby reducing DL throughput degradation). In Case 3, enabling SR transmission through PF3 on the Acell/SCG (in addition to PUCCH on the Pcell/PCG) to reduce transmission of the SR-dedicated PUCCH (simultaneous transmission of the PUCCH and the A/N PUCCH corresponding to the Acell/SCG) on the Pcell/PCG (based on Alt 2/3) as much as possible and to simply add one-bit SR to the PF3 payload whenever possible is efficient in terms of PUCCH power control and transmission performance. Also, in Case 2, SR transmission may be allowed to be performed through the PF3 on the Acell/SCG (in addition to the PUCCH on the Pcell/PCG). Thereby, improvement of opportunistic DL/UL transmission performance may be expected. For Case 2, the above operation (for example, Alt 2/3) may be configured only in a situation where the TDD CHsel scheme is configured for the PCG.

If both SR transmission through PF3 on a particular cell/CG and SR transmission through SR PUCCH on a different cell/CG are possible at the same point in time (with Alt 1, Alt 2, or Alt 3 applied), 1) the SR may be transmitted only through PF3 (i.e., only through the PF3 PUCCH resource), or 2) the SR may be transmitted through both the PF3 and the SR PUCCH (namely, the SR may be transmitted on both the PF3 PUCCH resource and the SR PUCCH resource).

If SR transmission through PF3 is possible for a plurality of cells/CGs at the same time, 1) the SR may be transmitted only through PF3 on a specific cell/CG (for example, Pcell/PCG), or 2) the SR may be transmitted through all the PF3s on the plurality of cells/CGs. For example, if an SR is triggered and both the Pcell and the Acell have respective configured PUCCH resources at the same time, i.e., in the same subframe, 1) the SR may be transmitted only on a PUCCH resource on a specific cell (Pcell as in FIG. 13(a) or Acell as in FIG. 13(b)), as shown in FIG. 13, or 2) the SR may be transmitted on both the PUCCH resource on the Pcell and the PUCCH resource on the Acell.

In the case where SR transmission is allowed to be performed through PF3 on a specific cell/CG, if whether or not to add 1 bit to the PF3 payload depends on whether or not the SR is positive or negative, the eNB should perform both decoding based on the PF3 payload size and decoding based on PF3 payload size+1 bit on every PF3 resource. In consideration of such an issue, 1 bit for SR transmission may always be added to the corresponding PF3 payload in an SF configured as the time available for SR transmission (regardless of whether the SR is positive or negative).

In the CA situation, deactivating (and then re-activating), at a specific time, the Acell on which the PUCCH transmission is configured may be considered as in the case of a typical Scell. In the case of a conventional typical Scell, the UE may stop transmitting all UL channels/signals (e.g., PUSCH, SRS) through the deactivated Scell. Considering an Acell with SR PUCCH transmission configured, if transmitting the SR, which is a signal sent by the UE to the eNB to request scheduling of the UL data transmission resource, is stopped, there is a possibility that effective UL scheduling at an appropriate time may not be performed.

In an embodiment of the present invention, in order to allow UL scheduling to be performed at an appropriate time, for an Acell with SR PUCCH transmission configured, the UE may exceptionally perform SR transmission based on the given period and resource even if the Acell is in the deactivated state. This embodiment may be applied only when SR PUCCH transmission is configured to be performed only through the Acell. In other words, this embodiment may be applied when there is a reserved SR PUCCH resource for the Acell but there is no reserved PUCCH resource for the Pcell at the time of SR transmission.

In another embodiment of the present invention for allowing UL scheduling to be performed at an appropriate time, when the Acell on which SR PUCCH transmission is configured is switched to the deactivated state, the UE may request UL scheduling through a random access procedure through PRACH (preamble) signal transmission (rather than stopping SR transmission on the Acell). This embodiment may be applied only when SR PUCCH transmission is configured to be performed only through the Acell. In other words, this embodiment may be applied when there is a reserved SR PUCCH resource for the Acell but there is no reserved PUCCH resource for the Pcell at the time of SR transmission.

Referring to FIG. 14(a), if the SR is triggered while the Acell is deactivated, the UE may immediately initiate the random access procedure. For example, if an SR is triggered while the Acell is deactivated, the UE may not wait until the time reaches a subframe having a PUCCH resource on the Pcell, but may initiate the random access procedure on the Pcell before the number of SR transmissions reaches the maximum number M.

Referring to FIG. 14(b), if the Acell is deactivated before the UL grant is received after the SR is triggered, the UE may stop transmitting the SR and initiate the random access procedure even before the number of SR transmissions reaches the maximum number. For example, if the Acell is deactivated in the SR transmission process, the UE may not wait until reaching a subframe having a PUCCH resource on the Pcell, but may stop transmitting the SR and perform the random access procedure on the Pcell even before reaching the maximum number of SR transmissions M.

Alternatively, Opt 1 or Opt 2 for SR PUCCH transmission may be considered:

Opt 1) SR PUCCH transmission is configured to be performed only through the Pcell.

Opt 2) SR PUCCH transmission is allowed to be performed through both the Pcell and the Acell.

Only one of Opt 1 and Opt 2 may be considered. In other words, configuring SR PUCCH transmission to be performed only through the Acell may be excluded. Opt 2 may operate such that the SR is transmitted only through the Acell if the Acell is in the activated state, and is transmitted only through the Pcell if the Acell is in the deactivated state (in order to maximize frequency of PUCCH offload to the Acell)

Even for an Acell in which PUCCH transmission is configured, UL power control may be performed based on a transmit power control (TPC) command through DCI format 3/3A, similar to the case of the Pcell. In this case, DCI format 3/3A may be transmitted through the Acell or through the Pcell. In the case of the conventional typical Scell, the UE may stop detecting/receiving all DCI (and a control channel carrying the same) for the Scell with the Scell deactivated. Unlike the typical Scell in which only re-transmittable PUSCH transmission is performed, the Acell may be required to perform stable UCI PUCCH transmission from the time when it is switched back to the activated state since it is a cell responsible for PUCCH transmission (for carrying important UCI) that is not re-transmittable.

Accordingly, in an embodiment of the present invention, for an Acell having the PUCCH transmission configured, the UE may exceptionally perform detection/reception of DCI format 3/3A configured for UL power control of the Acell even when the UE is deactivated, and the TPC command in the corresponding DCI may be applied to the Acell UL (e.g., PUCCH) power control procedure. For example, the TPC value in DCI format 3/3A configured for UL power control of the Acell may be accumulated.

Alternatively, the eNB may trigger transmission of a specific UL signal (e.g., PUCCH or SRS or PUSCH) through a signal (e.g., a MAC message) for instructing switch to the activated state for the Acell (while the UE does not stop detection/reception of DCI format 3/3A for the Acell), such that the eNB may perform fast UL power control for the Acell.

Alternatively, the eNB may directly transmit a TPC command in a signal (e.g., a MAC message) for instructing switch to the activated state for the Acell (while the UE does not stop detection/reception of DCI format 3/3A for the Acell). The UE may apply the received TPC to UL power control of the Acell. Alternatively, the eNB may preset a specific power offset and cause the UE to apply the power offset to UL power control of the Acell at a time when the Acell is switched to the activated state, (while the UE does not stop detection/reception of DCI format 3/3A for the deactivated Acell).

Alternatively, the UE may not perform PUCCH transmission before transmission of another UL channel/signal (e.g., PUSCH or SRS) is performed through the Acell after the Acell is switched to the activated state (and stopping detection/reception of DCI format 3/3A for the deactivated Acell). This method may be applied only to PUCCH transmission carrying periodic CSI. Alternatively, the UE may not perform PUCCH transmission until receiving a (DCI format 3/3A-based) TPC command for PUCCH transmission in the Acell after the Acell is switched to the activated state (and the UE stops detection/reception of DCI format 3/3A for the deactivated Acell). This method may be applied only to PUCCH transmission carrying periodic CSI.

When DCI format 3/3A carrying a TPC for Acell is transmitted through the Pcell, the operation of (the UE) stopping detection/reception of the DCI may be changed according to the configuration. For example, if the higher layer signal TPC-PDCCH-Config is used in configuring RNTIs and indexes for PUCCH and PUSCH power control, and different TPC-PUCCH-RNTIs are allocated to the Pcell and the Acell, the UE may stop detecting/receiving DCI format 3/3A based on the for RNTI allocated to the Acell. In another example, if the same TPC-PUCCH-RNTI is allocated to the two cells but different tpc-Indexes are allocated to the respective cells, the UE may perform (rather than stopping) detection/reception of the corresponding RNTI-based DCI format 3/3A, ignoring the tpc-Index allocated to the Acell and the corresponding TPC.

Figure 15:
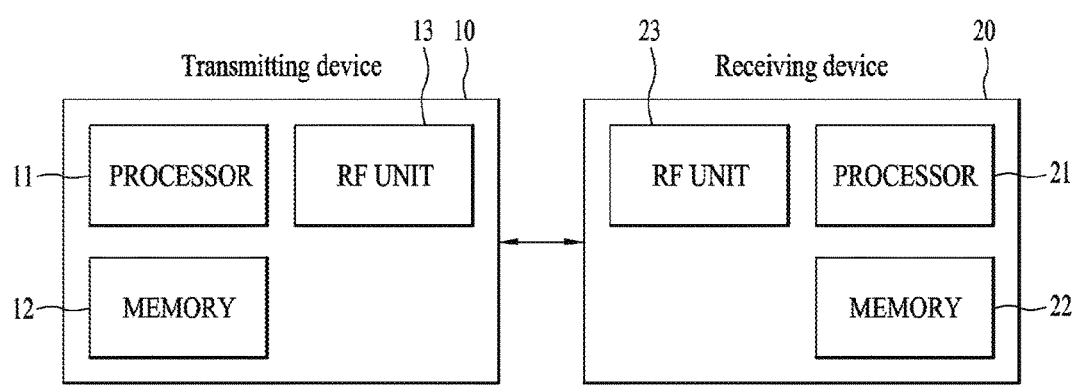
FIG. 15 is a block diagram illustrating elements of a transmitting device 10 and a receiving device 20 for implementing the present invention.

FIG. 15 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may configure or allocate SR PUCCH resources, ACK/NACK PUCCH resources, and CSI PUCCH resources to the Pcell and the Acell according to one of the embodiments of the present invention. The eNB processor may control the eNB RF unit to transmit information on a configured PUCCH resource to the UE. For example, the eNB processor may configure (i.e., reserve) SR PUCCH resources for the Pcell and the Acell. The eNB processor may control the eNB RF unit to transmit SR PUCCH configuration information for the Pcell and SR PUCCH configuration information for the Acell. The eNB processor may control the eNB RF unit to configure a PF3 resource, i.e., a PF3 PUCCH resource, and to transmit configuration information about the PF3 PUCCH to the UE. The eNB processor may control the eNB RF unit to receive SR and/or ACK/NACK using PUCCH resources on at least the Acell or the Pcell, according to one of the embodiments of the present invention. The eNB processor may control the eNB RF unit to transmit configuration information (hereinafter, TPC PDCCH configuration information) about a PDCCH for carrying a TPC used for power control for the PUCCH and the PUSCH and DCI format 3/3A used for transmission of the TPC for the PUCCH and the PUSCH. The eNB processor may control the eNB RF unit to receive at least the PUCCH or the PUSCH according to the TPC PDCCH configuration information and DCI format 3 or 3A.

The UE processor of the present invention may configure or allocate SR PUCCH resources, ACK/NACK PUCCH resources, and CSI PUCCH resources to the Pcell and the Acell according to one of the embodiments of the present invention. The UE processor may control the UE RF unit to receive (implicit or explicit) PUCCH configuration information about a PUCCH resource configured for the UE. The UE processor may configure the PUCCH resource(s) based on the PUCCH configuration information. For example, the UE processor may configure (i.e., reserve) SR PUCCH resources for the Pcell and the Acell according to the SR configuration information. The UE processor may control the UE RF unit to receive SR PUCCH configuration information for the Pcell and SR PUCCH configuration information for the Acell. When the SR is triggered, the UE processor may control the UE RF unit to transmit the SR PUCCH, based on the SR PUCCH configuration information. The UE processor may control the UE RF unit to receive a PF3 resource, i.e., configuration information about a PF3 PUCCH resource, and control the UE RF unit to transmit the PUCCH of PF3 based on configuration information about the PF3 PUCCH resource. The UE processor may control the UE RF unit to transmit the SR and/or ACK/NACK using PUCCH resources on at least the Acell or the Pcell according to one of the embodiments of the present invention. The UE processor may control the UE RF unit to receive configuration information (hereinafter, TPC PDCCH configuration information) about a PDCCH for carrying a TPC used for power control for the PUCCH and the PUSCH and DCI format 3/3A used for transmission of the TPC for the PUCCH and the PUSCH. The UE processor may control the UE RF unit to transmit at least the PUCCH or the PUSCH according to the TPC PDCCH configuration information and DCI format 3 or 3A.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed is:

1. A method for transmitting a scheduling request (SR), the method performed by a user equipment (UE) and comprising:
    configuring a first physical uplink control channel (PUCCH) resource on a first cell belonging to a first cell group for the UE for acknowledgement/negative acknowledgement (ACK/NACK) feedback for the first cell group;
    configuring a second PUCCH resource for the SR on a second cell belonging to a second cell group for the UE; and
    transmitting the SR on only the configured first PUCCH resource in a time interval including the configured second PUCCH resource when the ACK/NACK feedback is transmitted in the time interval,
    wherein the first cell group comprises one or more of a plurality of cells for the UE,
    wherein the second cell group comprises one or more of the plurality of cells not belonging to the first cell group,
    wherein the plurality of cells includes a primary cell (Pcell) and one or more secondary cell (Scells), and
    wherein either the first cell is the Pcell and the second cell is one of the one or more Scells or the second cell is the Pcell and the first cell is one of the one or more Scells.

2. The method according to claim 1, further comprising:
    configuring a third PUCCH resource on the second cell for ACK/NACK feedback for the second cell group; and
    transmitting the ACK/NACK feedback for the second cell group on the configured third PUCCH resource.

3. The method according to claim 1, further comprising performing a random access procedure other than transmission of the SR when there is no PUCCH resource configured for the SR on another cell and the second cell is in a deactivated state.

4. The method according to claim 1, further comprising:
configuring a third PUCCH resource on the first cell for the SR; and
transmitting the SR on only one PUCCH resource in the time interval when the time interval includes the configured second PUCCH resource and the configured third PUCCH resource.

5. The method according to claim 1, further comprising:
adding 1-bit for the SR to the ACK/NACK feedback; and
transmitting the ACK/NACK feedback with the 1-bit added on the configured first PUCCH resource in the same time interval in which the ACK/NACK feedback is transmitted.

6. A user equipment (UE) for transmitting a scheduling request (SR), the UE comprising:
a radio frequency (RF) module that transmits and receives signals; and
a processor configured to control the (RF) module, wherein the processor:
configures a first physical uplink control channel (PUCCH) resource on a first cell belonging to a first cell group for the UE for acknowledgement/negative acknowledgement (ACK/NACK) feedback for the first cell group;
configures a second PUCCH resource for the SR on a second cell belonging to a second cell group for the UE; and
controls the RF module to transmit the SR on only the configured first PUCCH resource in a time interval including the configured second PUCCH resource when the ACK/NACK feedback is transmitted in the time interval,
wherein the first cell group comprises one or more of a plurality of cells for the UE,
wherein the second cell group comprises one or more of the plurality of cells not belonging to the first cell group,
wherein the plurality of cells includes a primary cell (Pcell) and one or more secondary cell (Scells), and
wherein either the first cell is the Pcell and the second cell is one of the one or more Scells or the second cell is the Pcell and the first cell is one of the one or more Scells.

7. The UE according to claim 6, wherein the processor further:
configures a third PUCCH resource on the second cell for ACK/NACK feedback for the second cell group; and
controls the RF module to transmit the ACK/NACK feedback for the second cell group on the configured third PUCCH resource.

8. The UE according to claim 6, wherein the processor further controls the RF module to perform a random access procedure other than transmission of the SR when there is no PUCCH resource configured for the SR on another cell and the second cell is in a deactivated state.

9. The UE according to claim 6, wherein the processor further:
configures a third PUCCH resource on the first cell for the SR; and
controls the RF module to transmit the SR on only one PUCCH resource in the time interval when the time interval includes the configured second PUCCH resource and the configured third PUCCH resource.

10. The UE according to claim 6, wherein the processor further:
adds 1-bit for the SR to the ACK/NACK feedback; and
controls the RF module to transmit the ACK/NACK feedback with the 1-bit added on the configured first PUCCH resource in the same time interval in which the ACK/NACK feedback is transmitted.

11. A method for receiving a scheduling request (SR), the method performed by a base station (BS) and comprising:
transmitting configuration information on a first physical uplink control channel (PUCCH) resource for acknowledgement/negative acknowledgement (ACK/NACK) feedback for a first cell group for a user equipment (UE);
transmitting configuration information on a second PUCCH resource for the SR; and
receiving the SR on only the first PUCCH resource in a time interval including the second PUCCH resource when the ACK/NACK feedback is received in the time interval,
wherein the first PUCCH resource is configured on a first cell belonging to the first cell group,
wherein the second PUCCH resource is configured on a second cell belonging to a second cell group for the UE,
wherein the first cell group comprises one or more of a plurality of cells for the UE,
wherein the second cell group comprises one or more of the plurality of cells not belonging to the first cell group,
wherein the plurality of cells includes a primary cell (Pcell) and one or more secondary cell (Scells), and
wherein either the first cell is the Pcell and the second cell is one of the one or more Scells or the second cell is the Pcell and the first cell is one of the one or more Scells.

12. The method according to claim 11, further comprising transmitting configuration information on a a third PUCCH resource on the second cell for ACK/NACK feedback for the second cell group.

13. The method according to claim 11, further comprising performing a random access procedure other than receiving the SR when there is no PUCCH resource configured for the SR on another cell and the second cell is in a deactivated state.

14. The method according to claim 11, further comprising:
transmitting configuration information on a third PUCCH resource for the ACK/NACK feedback for the first cell group; and
receiving the SR on only one PUCCH resource in the time interval when the time interval includes the second PUCCH resource and the third PUCCH resource.

15. A base station (BS) for receiving a scheduling request (SR), the BS comprising:
a radio frequency (RF) module that transmits and receives signals; and
a processor configured to control the (RF) module, wherein the processor:
controls the (RF) module to transmit configuration information on a first physical uplink control channel (PUCCH) resource for acknowledgement/negative acknowledgement (ACK/NACK) feedback for a first cell group for a user equipment (UE);
controls the (RF) module to transmit configuration information on a second PUCCH resource for the SR; and
control the (RF) module to receive the SR on only the first PUCCH resource in a time interval including the second PUCCH resource when the ACK/NACK feedback is received in the time interval,
wherein the first PUCCH resource is configured on a first cell belonging to the first cell group,
wherein the second PUCCH resource is configured on a second cell belonging to a second cell group for the UE,
wherein the first cell group comprises one or more of a plurality of cells for the UE,
wherein the second cell group comprises one or more of the plurality of cells not belonging to the first cell group,
wherein the plurality of cells includes a primary cell (Pcell) and one or more secondary cell (Scells), and
wherein either the first cell is the Pcell and the second cell is one of the one or more Scells or the second cell is the Pcell and the first cell is one of the one or more Scells.

16. The BS according to claim 15, wherein the processor further controls the (RF) module to transmit configuration information on a a third PUCCH resource on the second cell for ACK/NACK feedback for the second cell group.

17. The BS according to claim 15, wherein the processor further performs a random access procedure other than controlling the RF module to receive the SR when there is no PUCCH resource configured for the SR on another cell and the second cell is in a deactivated state.

18. The BS according to claim 15, wherein the processor further:
controls the (RF) module to transmit configuration information on a third PUCCH resource for the ACK/NACK feedback for the first cell group; and
controls the (RF) module to receive the SR on only one PUCCH resource in the time interval when the time interval includes the second PUCCH resource and the third PUCCH resource.

* * * * *